United States Patent
Chiu et al.

(10) Patent No.: US 11,698,677 B1
(45) Date of Patent: Jul. 11, 2023

(54) PRESENTING A NOTIFICATION BASED ON AN ENGAGEMENT SCORE AND AN INTERRUPTION PRIORITY VALUE

(71) Applicant: Apple Inc., Cupertino, CA (US)

(72) Inventors: Shih Sang Chiu, San Francisco, CA (US); David H. Y. Huang, San Mateo, CA (US); Benjamin Hunter Boesel, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/323,577

(22) Filed: May 18, 2021

Related U.S. Application Data

(60) Provisional application No. 63/045,246, filed on Jun. 29, 2020.

(51) Int. Cl.
| | |
|---|---|
| *G08G 1/16* | (2006.01) |
| *G06V 20/58* | (2022.01) |
| *G06F 3/01* | (2006.01) |
| *G06F 3/16* | (2006.01) |
| *G06F 3/14* | (2006.01) |
| *G06V 20/20* | (2022.01) |

(52) U.S. Cl.
CPC .............. *G06F 3/013* (2013.01); *G06F 3/017* (2013.01); *G06F 3/14* (2013.01); *G06F 3/167* (2013.01); *G06V 20/20* (2022.01)

(58) Field of Classification Search
CPC ...................................................... G06F 3/013
USPC ....................................................... 345/629
See application file for complete search history.

(56) References Cited

U.S. PATENT DOCUMENTS

| | | | | |
|---|---|---|---|---|
| 8,493,198 | B1* | 7/2013 | Vasquez | G08G 1/16 |
| | | | | 340/436 |
| 9,310,874 | B2* | 4/2016 | Gunn | G09G 5/363 |
| 9,819,537 | B2* | 11/2017 | Palin | H04L 67/535 |
| 9,860,204 | B2* | 1/2018 | Touloumtzis | G08B 23/00 |
| 10,121,355 | B1* | 11/2018 | Mossoba | G06V 10/803 |

(Continued)

FOREIGN PATENT DOCUMENTS

WO 2017131748 A1 8/2017

OTHER PUBLICATIONS

"Real-Time Eye, Gaze, and Face Pose Tracking for Monitoring Driver Vigilance", 2002 Elsevier Science Ltd, Qiang Ji et al.*

*Primary Examiner* — Javid A Amini
(74) *Attorney, Agent, or Firm* — Fernando & Partners, LLP

(57) ABSTRACT

In accordance with various implementations, a method is performed at an electronic device with one or more processors, a non-transitory memory, and a display. The method includes determining an engagement score that characterizes a level of engagement between a user and a first object. The first object is located at a first location on the display. The method includes determining an interruption priority value that characterizes a relative importance of signaling a presence of a second object to the user. The second object is detectable by the electronic device. In some implementations, the method includes presenting the second object according to one or more output modalities of the electronic device. The method includes, in response to determining that the engagement score and the interruption priority value collectively together satisfy an interruption condition, presenting a notification.

26 Claims, 21 Drawing Sheets

(56) References Cited

U.S. PATENT DOCUMENTS

| | | | |
|---|---|---|---|
| 2014/0111420 A1* | 4/2014 | Ahn | G06F 3/0484 |
| | | | 345/156 |
| 2014/0375810 A1* | 12/2014 | Rodriguez | G06V 20/56 |
| | | | 348/148 |
| 2017/0255262 A1* | 9/2017 | Liu | G06F 3/015 |
| 2019/0294239 A1* | 9/2019 | Suzuki | G06F 3/013 |
| 2021/0116249 A1* | 4/2021 | Pecota | G02B 27/0172 |

* cited by examiner

PRESENTING A NOTIFICATION BASED ON AN ENGAGEMENT SCORE AND AN INTERRUPTION PRIORITY VALUE

CROSS-REFERENCE TO RELATED APPLICATION

This application claims priority to U.S. Provisional Patent App. No. 63/045,246, filed on Jun. 29, 2020, which is hereby incorporated by reference in its entirety.

TECHNICAL FIELD

The present disclosure relates to presenting computer-generated content, and, in particular, presenting computer-generated content based on extremity tracking.

BACKGROUND

A system may present a combination of computer-generated objects and physical objects. A user's level of engagement with respect to a particular object may be a function of various characteristics. For example, a user's level of focus with respect to a first object may vary over time. A system may modify an appearance of a first object based on the user's level of focus. However, when the user is focused on the first object, the system does not attempt to divert user engagement to a second object that is outside of the user's focus. Accordingly, the system provides a limited user experience.

SUMMARY

In accordance with some implementations, a method is performed at an electronic device with one or more processors, a non-transitory memory, and a display. The method includes determining an engagement score that characterizes a level of engagement between a user and a first object. The first object is located at a first location on the display. The method includes determining an interruption priority value that characterizes a relative importance of signaling a presence of a second object to the user. The second object is detectable by the electronic device. The method includes, in response to determining that the engagement score and the interruption priority value collectively together satisfy an interruption condition, presenting a notification.

In accordance with some implementations, an electronic device includes one or more processors, a non-transitory memory, and a display. One or more programs are stored in the non-transitory memory and are configured to be executed by the one or more processors. The one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

SUMMARY

Figure 1:
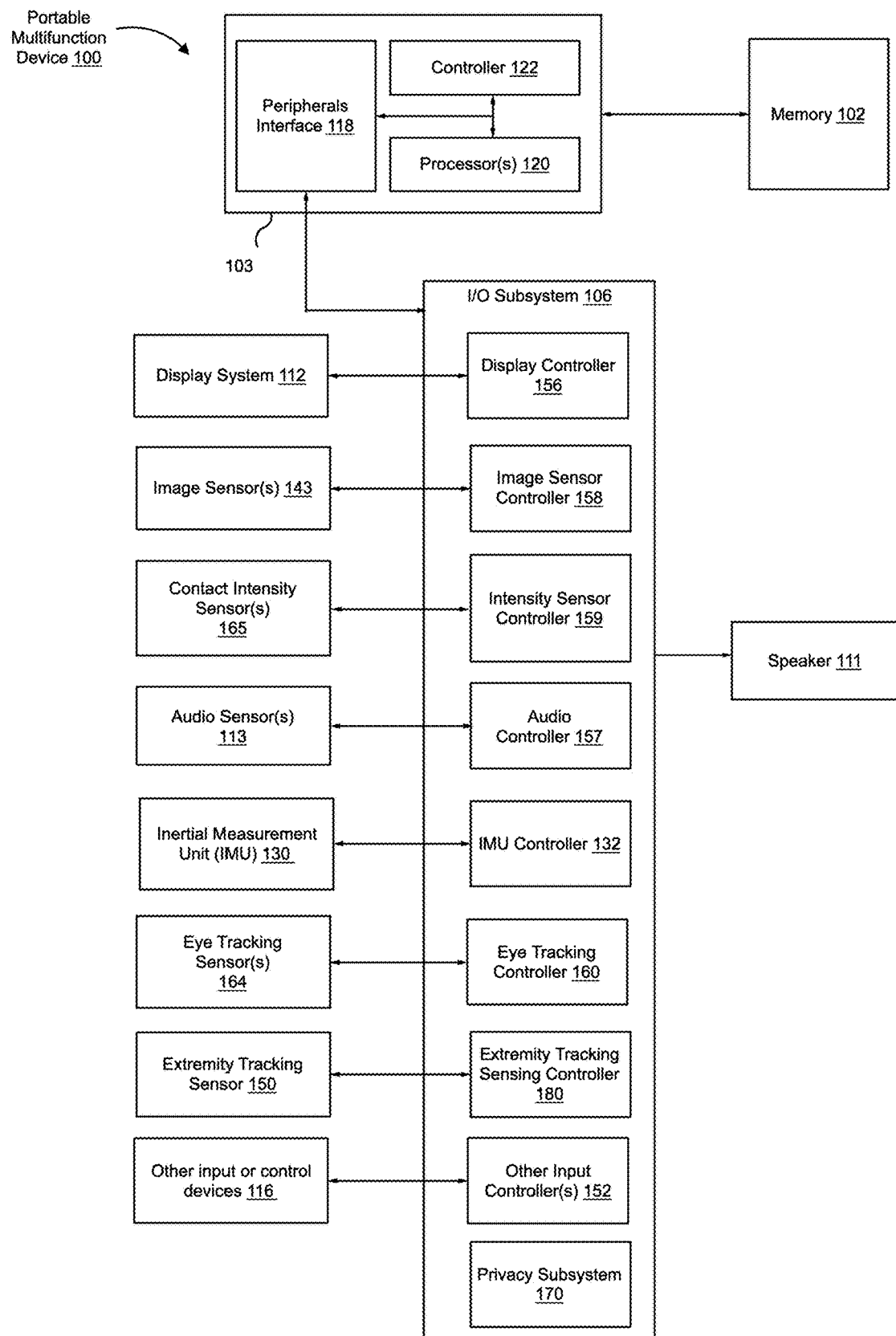
FIG. 1 is a block diagram of an example of a portable multifunction device in accordance with some implementations.

A system may present a combination of computer-generated objects (e.g., images, video, audio, smells, haptics, etc.) and physical objects. A user's level of engagement with respect to a particular object may be a function of various characteristics. For example, a user's level of focus with respect to a particular object may vary over time. The particular object may be a physical object or a computer-generated object. A system may modify an appearance of a particular object based on the user's level of focus, such as dimming a portion of the display associated with the particular object in response to detecting a threshold amount of user inactivity with respect to the particular object. However, when the user is focused on a first object, the system does not attempt to divert user engagement to a second object that is outside of the user's focus. Accordingly, the system provides a limited user experience.

By contrast, various implementations disclosed herein include methods, electronic devices, and systems for presenting a notification based on a function of an engagement score and an interruption priority value. The engagement score characterizes a level of engagement between a user and a first object. The first object (e.g., physical or computer-generated object) is located at a first location on a display. The interruption priority value characterizes a relative importance of signaling the presence of a second object (e.g., physical or computer-generated object) to the user. The second object is detectable by an electronic device. For example, the second object can include a computer-generated object or sensed physical object located outside of the user's periphery. In some implementations, the electronic device presents the second object according to one or more output modalities of the electronic device, such as a display modality or a sound modality. In some implementations, the second object is located at a second location on the display that is different from the first location. For example, while the user is engaged with reading a book, the second object appears in the periphery of the user. In some implementations, the second object is an entity, such as a person or animal.

In response to determining that the engagement score and the interruption priority value together satisfy an interruption condition, the electronic device presents a notification. For example, when the interruption priority value indicates that a virtual agent or character is attempting to engage a user (e.g., moving near the user or making loud noises towards the user's location), the electronic device presents the notification. As a counterexample, when the engagement score indicates that the user is highly engaged (e.g., watching a game winning basketball shot), a low or medium interruption priority value does not outweigh the relatively high engagement score, and thus the electronic device does not display a notification. In some implementations, the notification is a function of a combination of the engagement score and the interruption priority value, such as a playing a relatively loud notification sound when the interruption priority value indicates that the entity is also making a loud noise.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

Various examples of electronic systems and techniques for using such systems in relation to various computer-generated reality technologies are described.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display.

Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, and a privacy subsystem 170. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time of flight sensor that obtains depth information characterizing a particular object.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 may include a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a stylus.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2A:
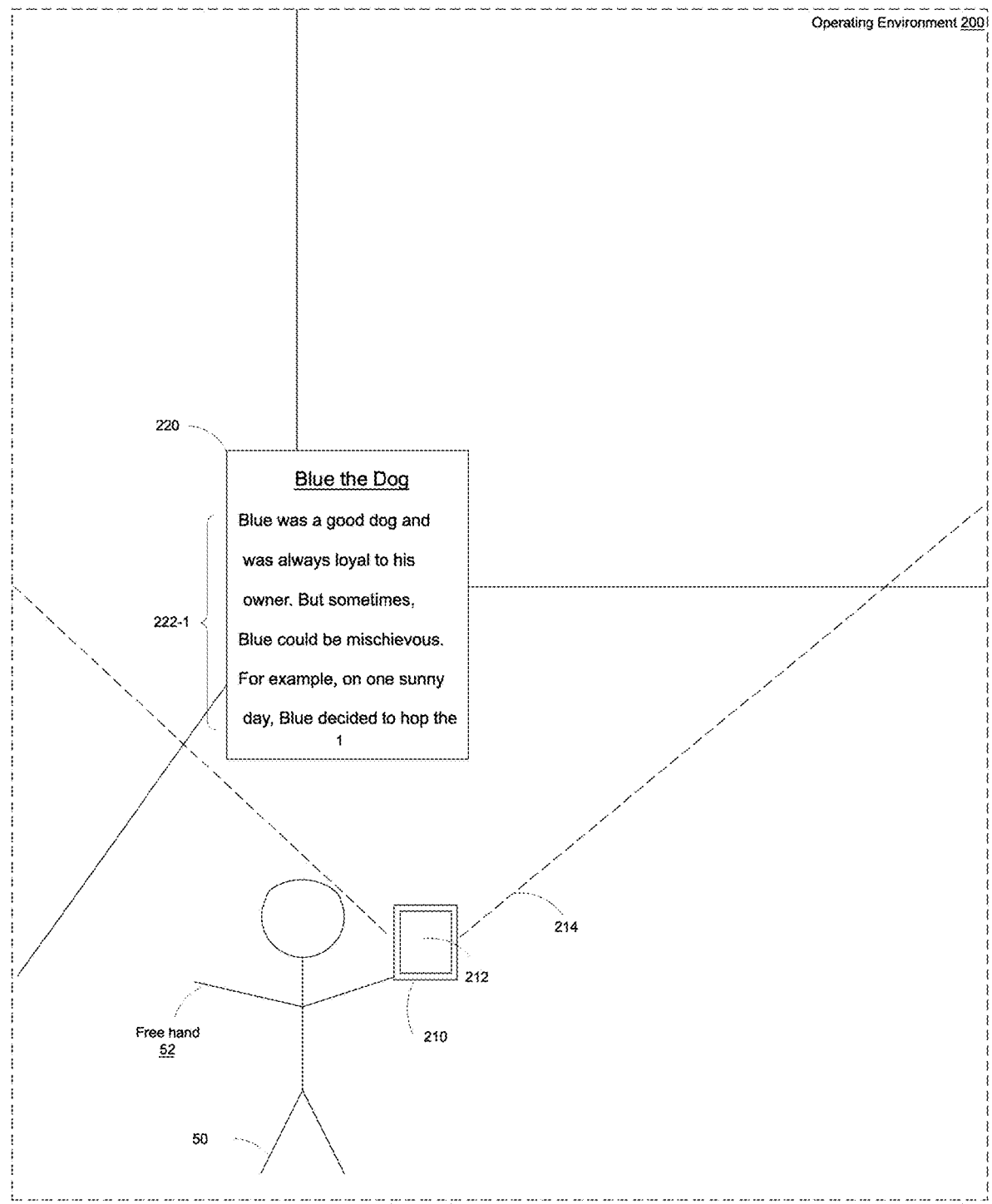
FIGS. 2A-2S are an example of presenting a notification based on an engagement score and an interruption priority value in accordance with some implementations.
Figure 2B:
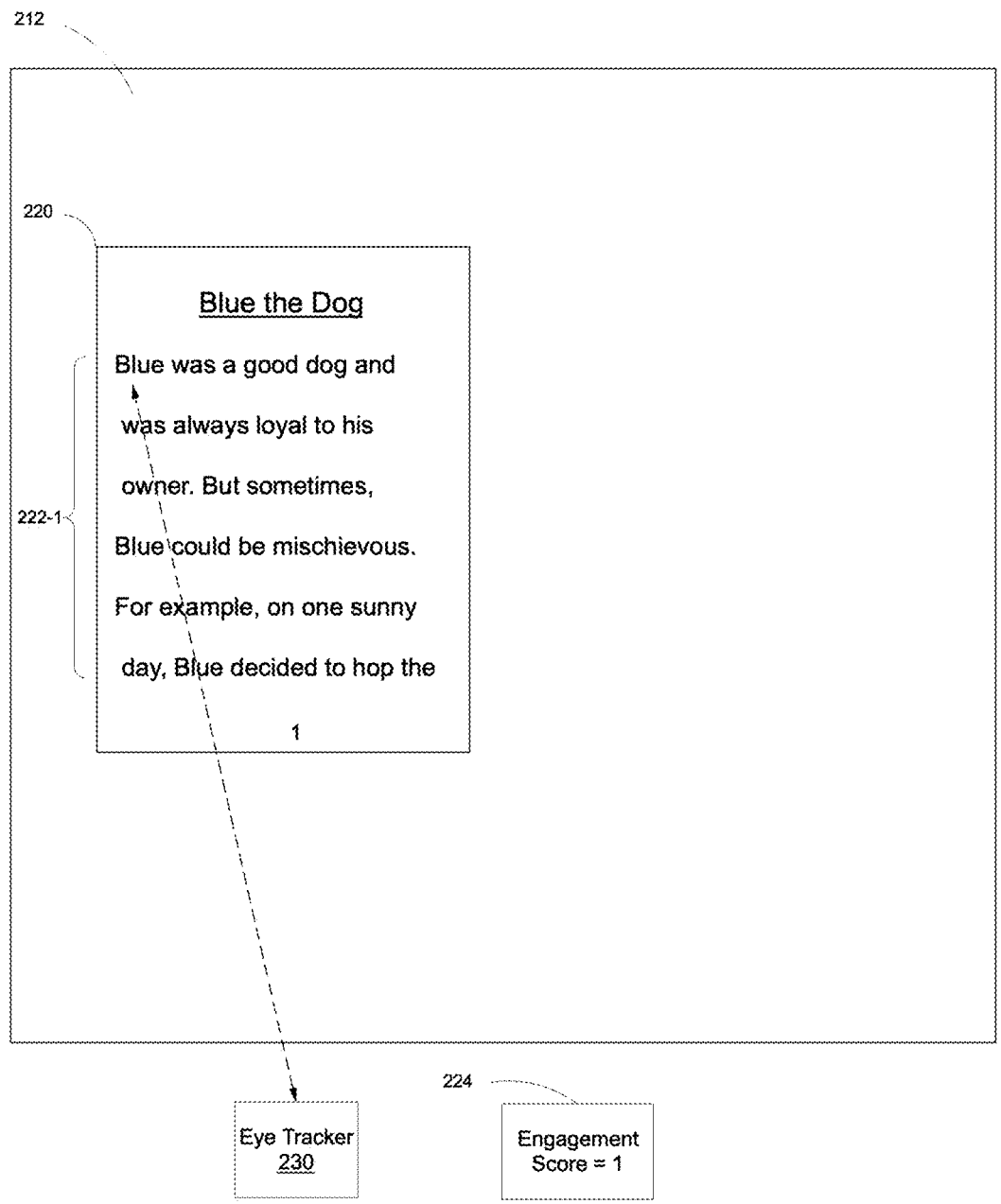
Figure 2C:
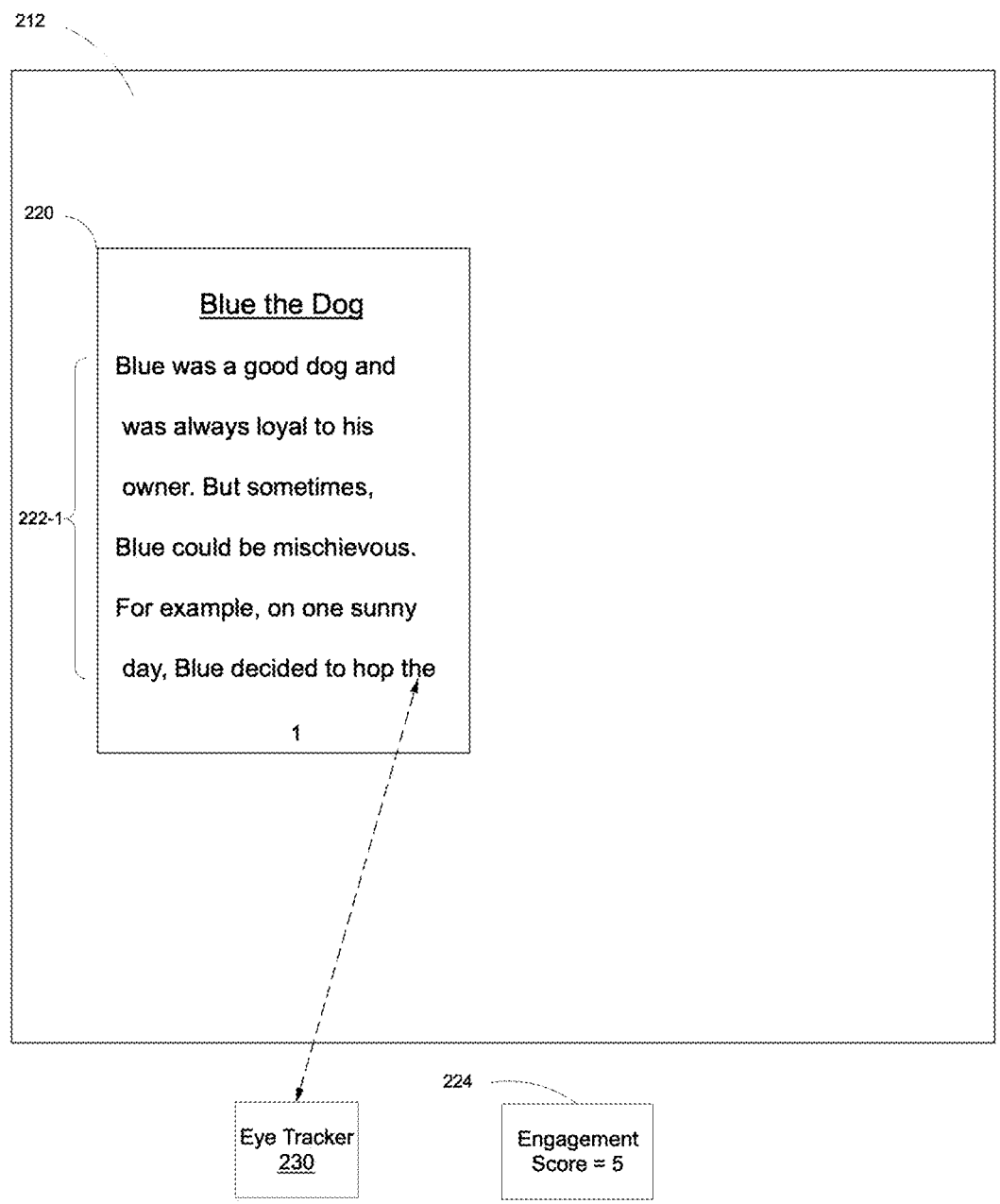
Figure 2D:
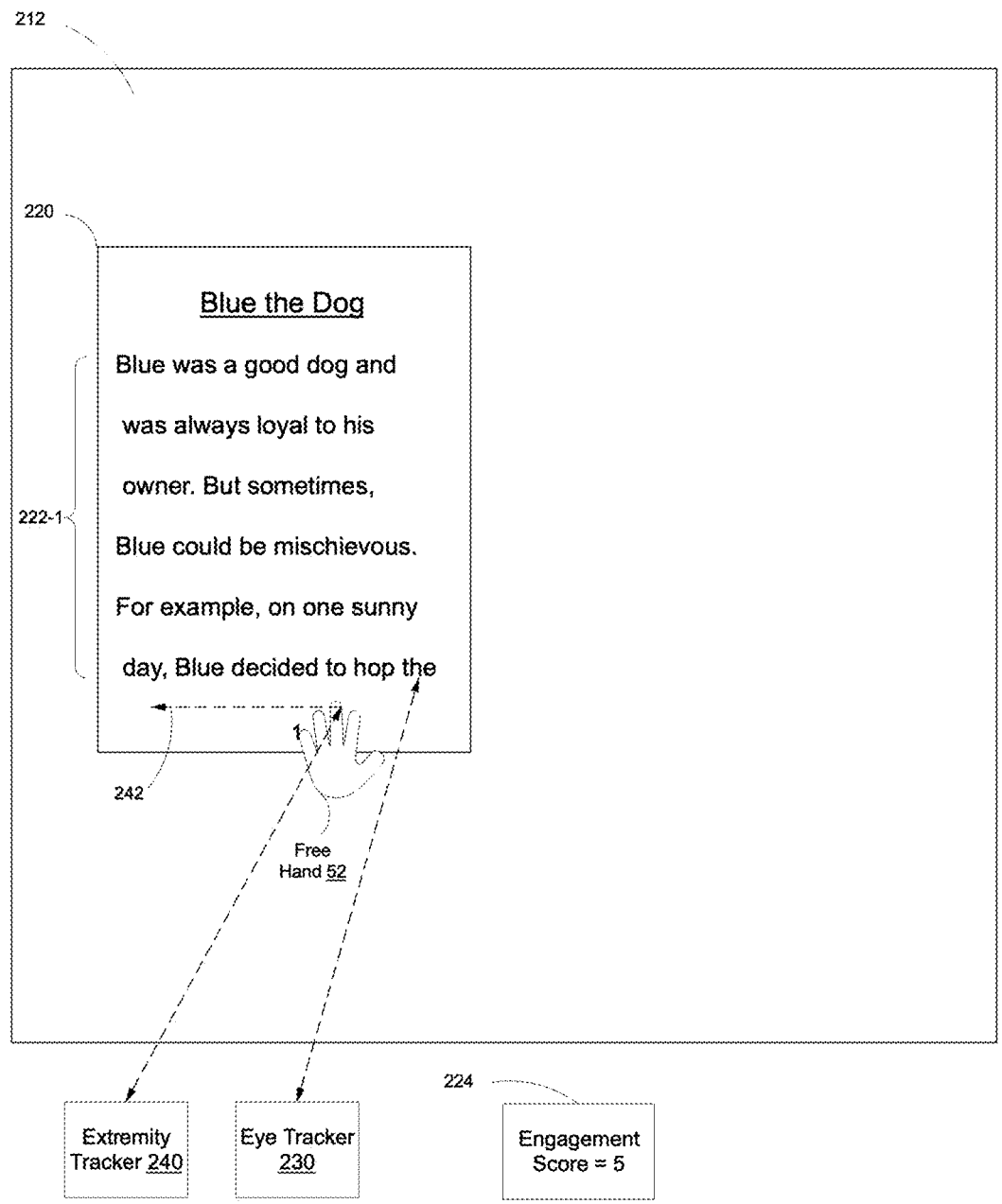
Figure 2E:
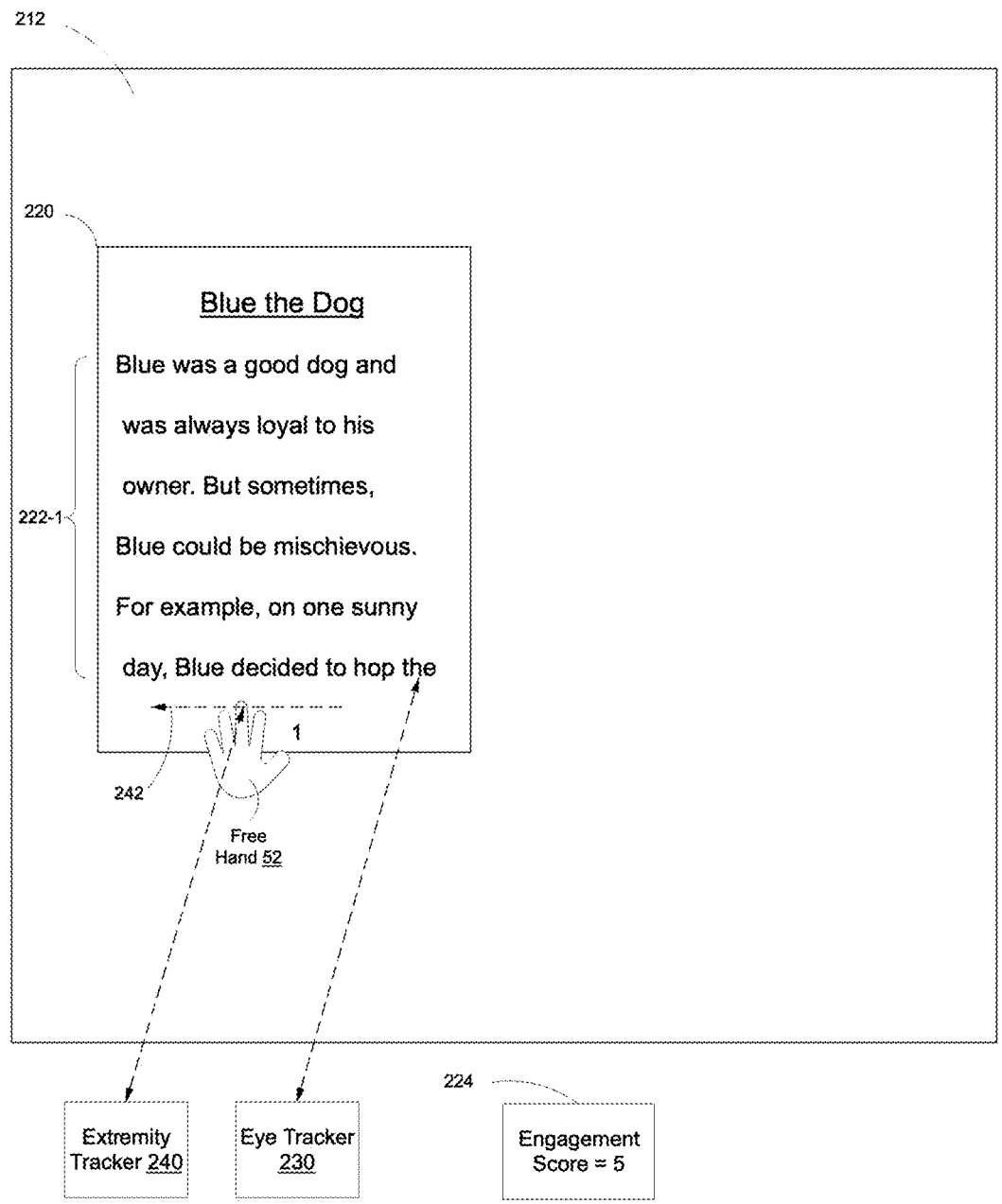
Figure 2F:
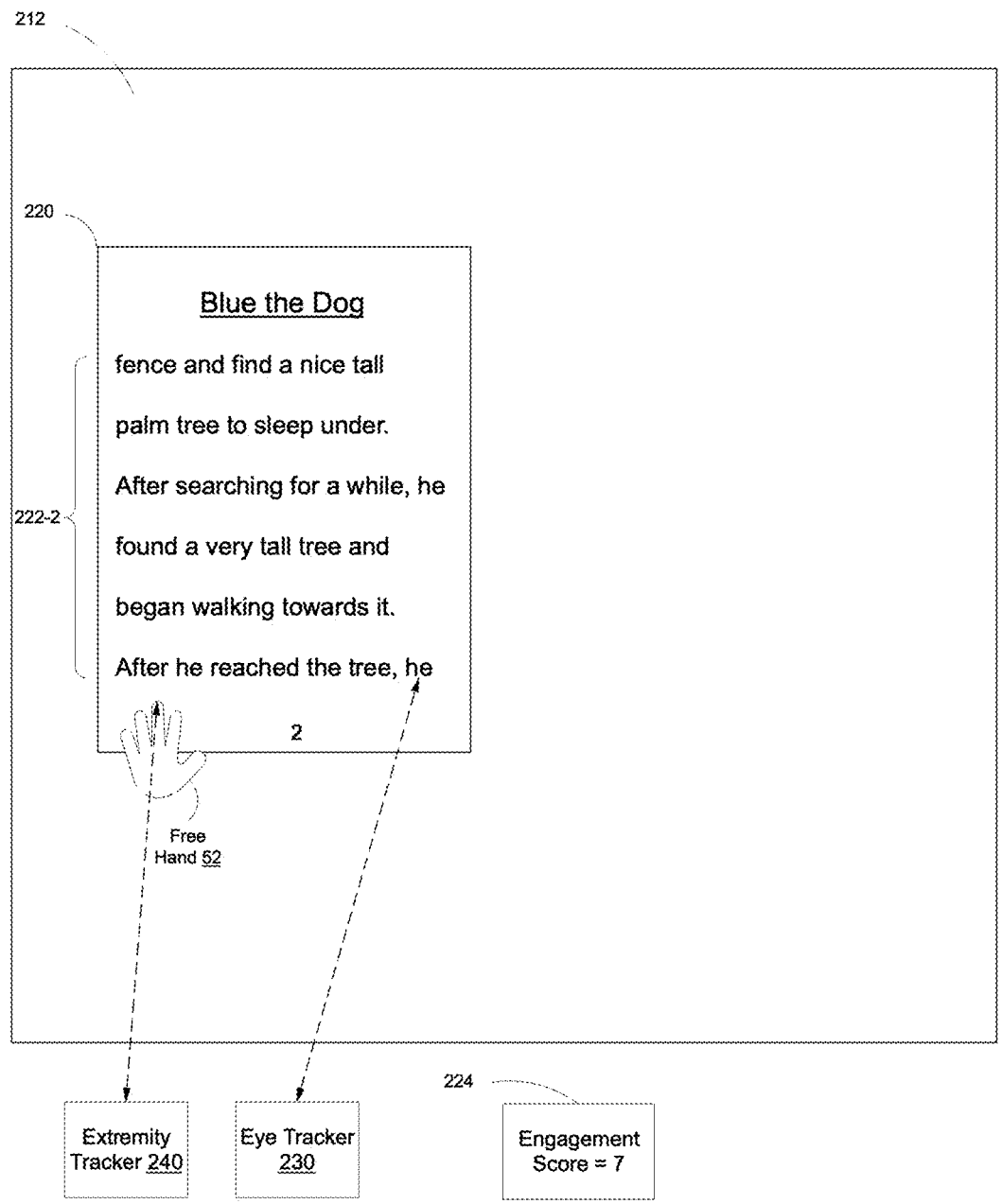
Figure 2G:
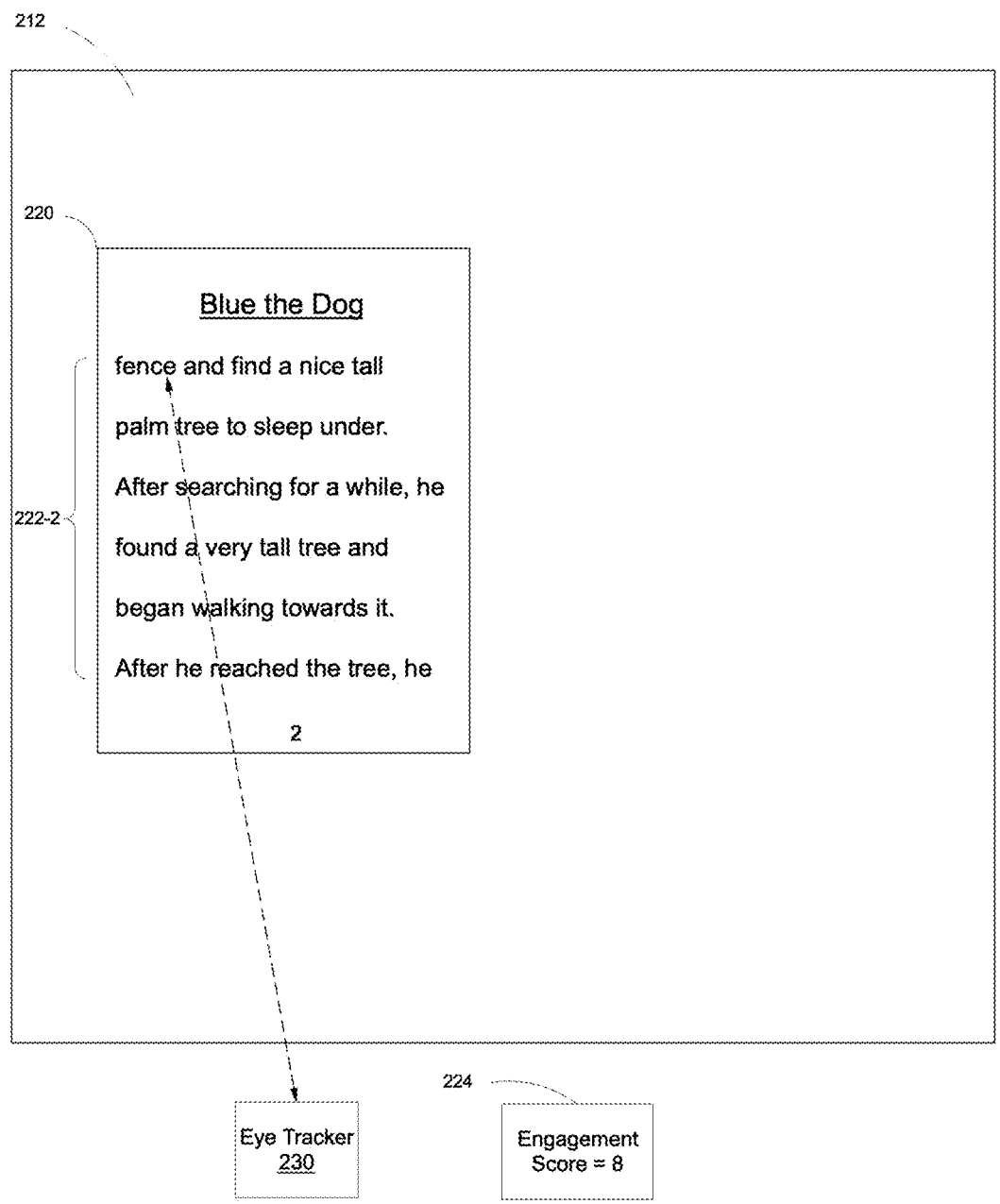
Figure 2H:
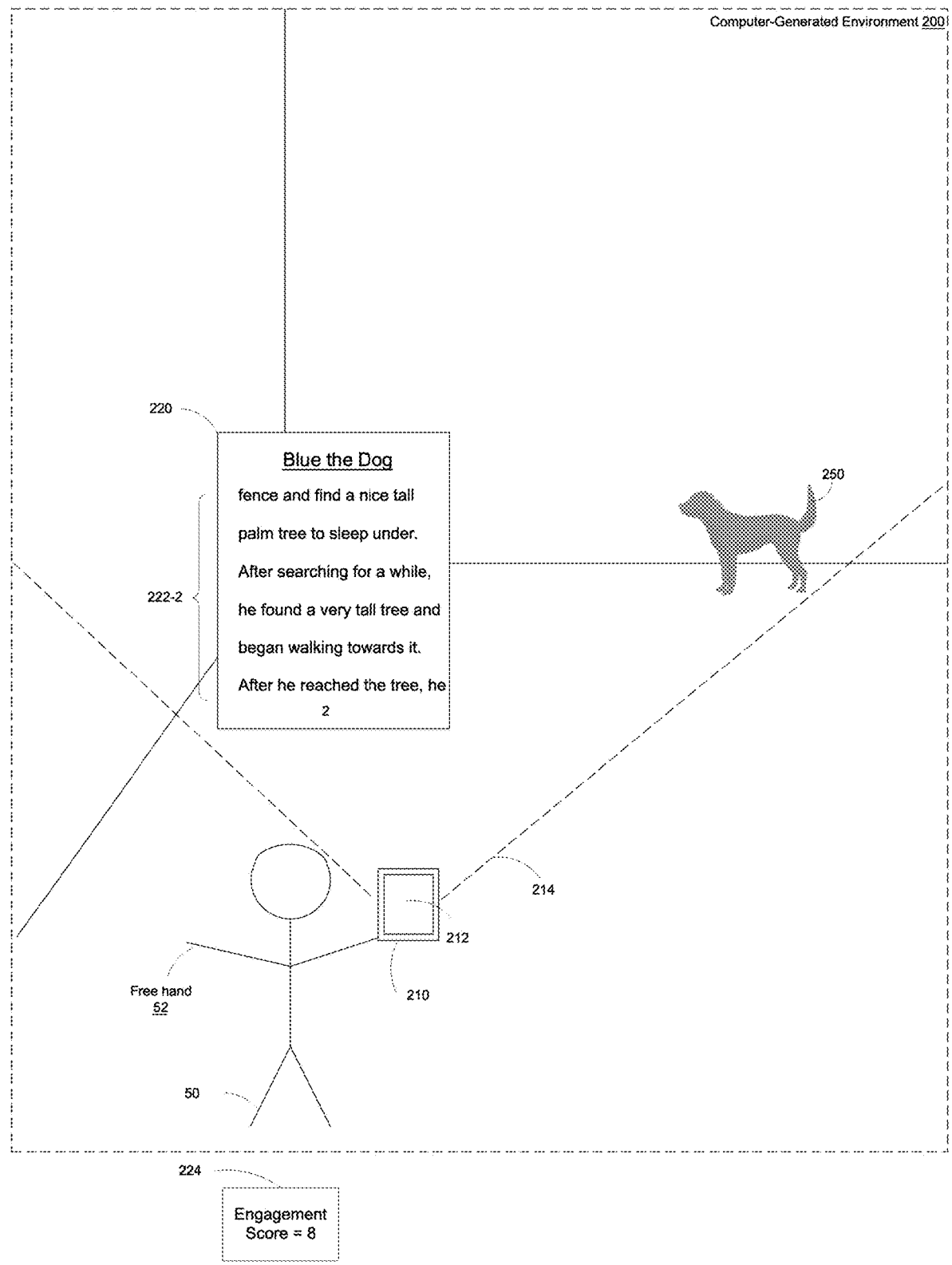
Figure 2I:
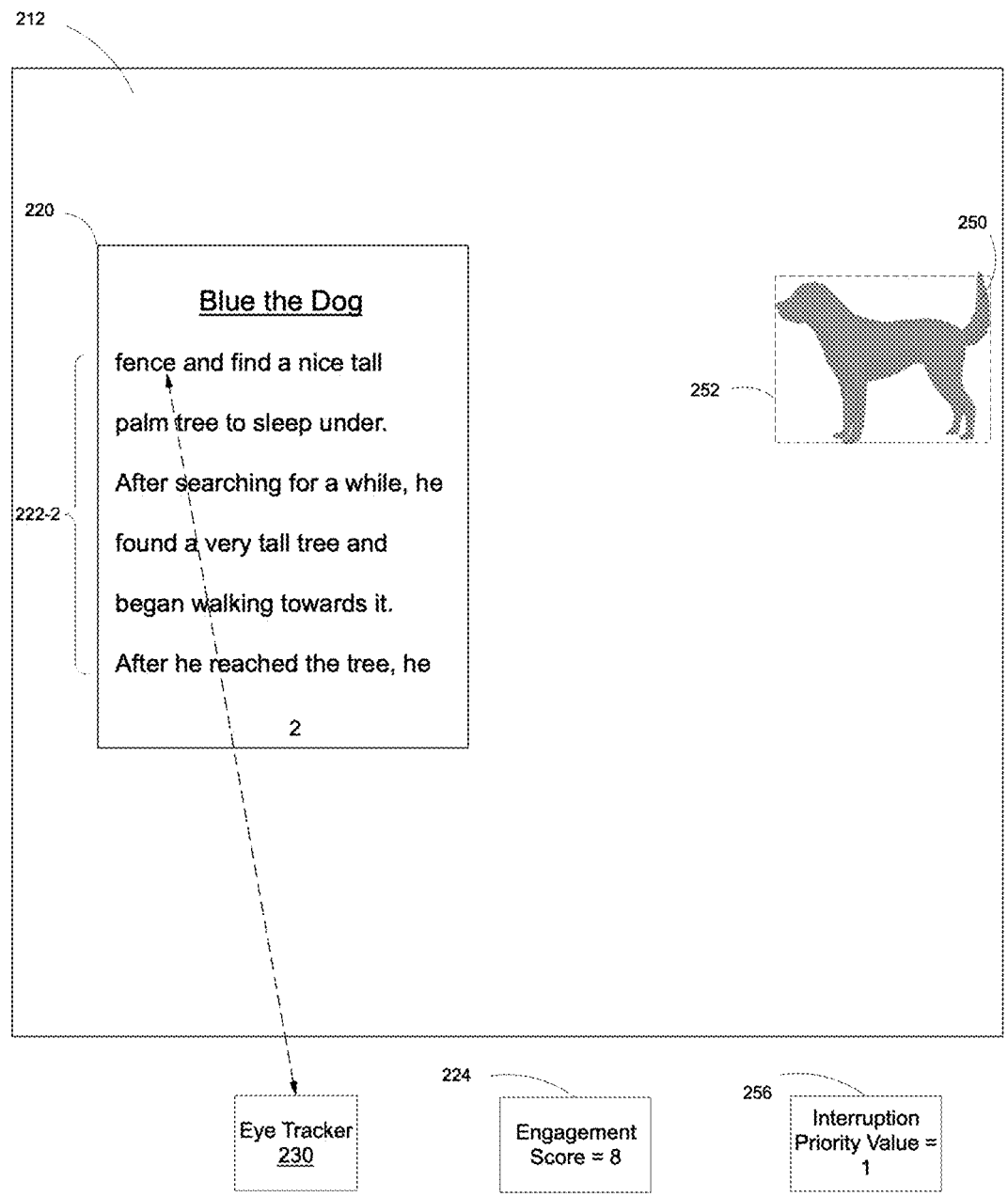
Figure 2J:
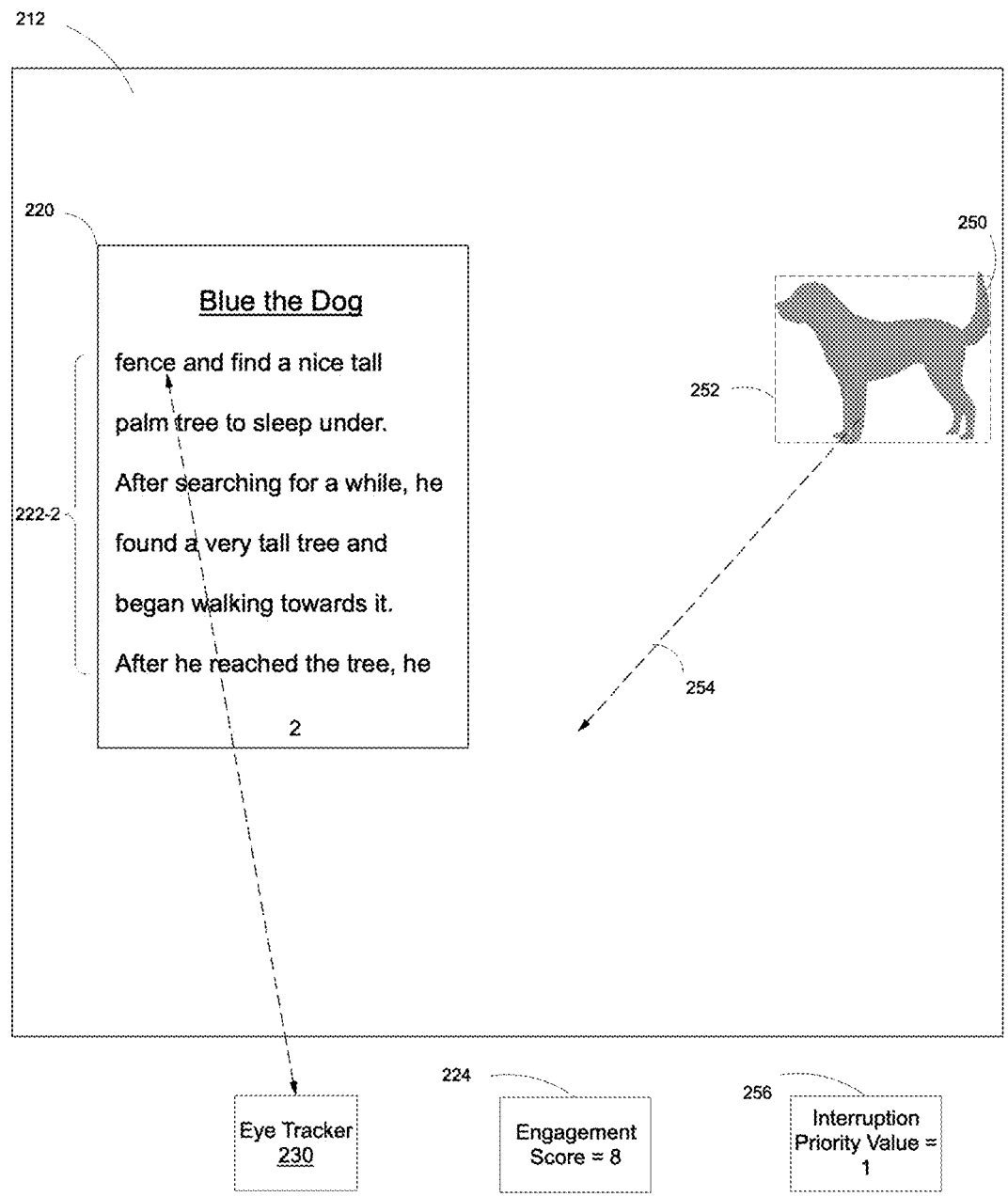
Figure 2K:
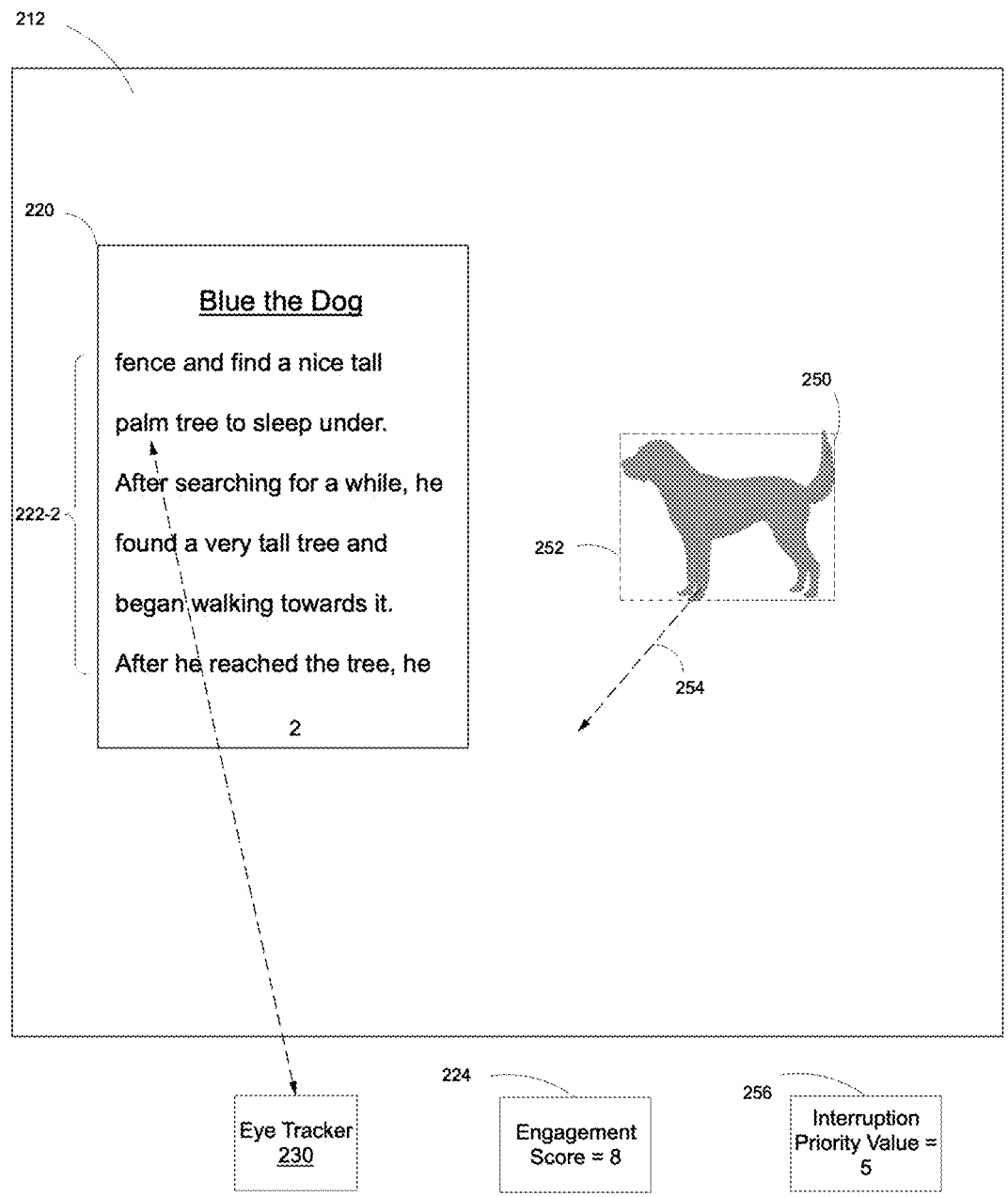
Figure 2L:
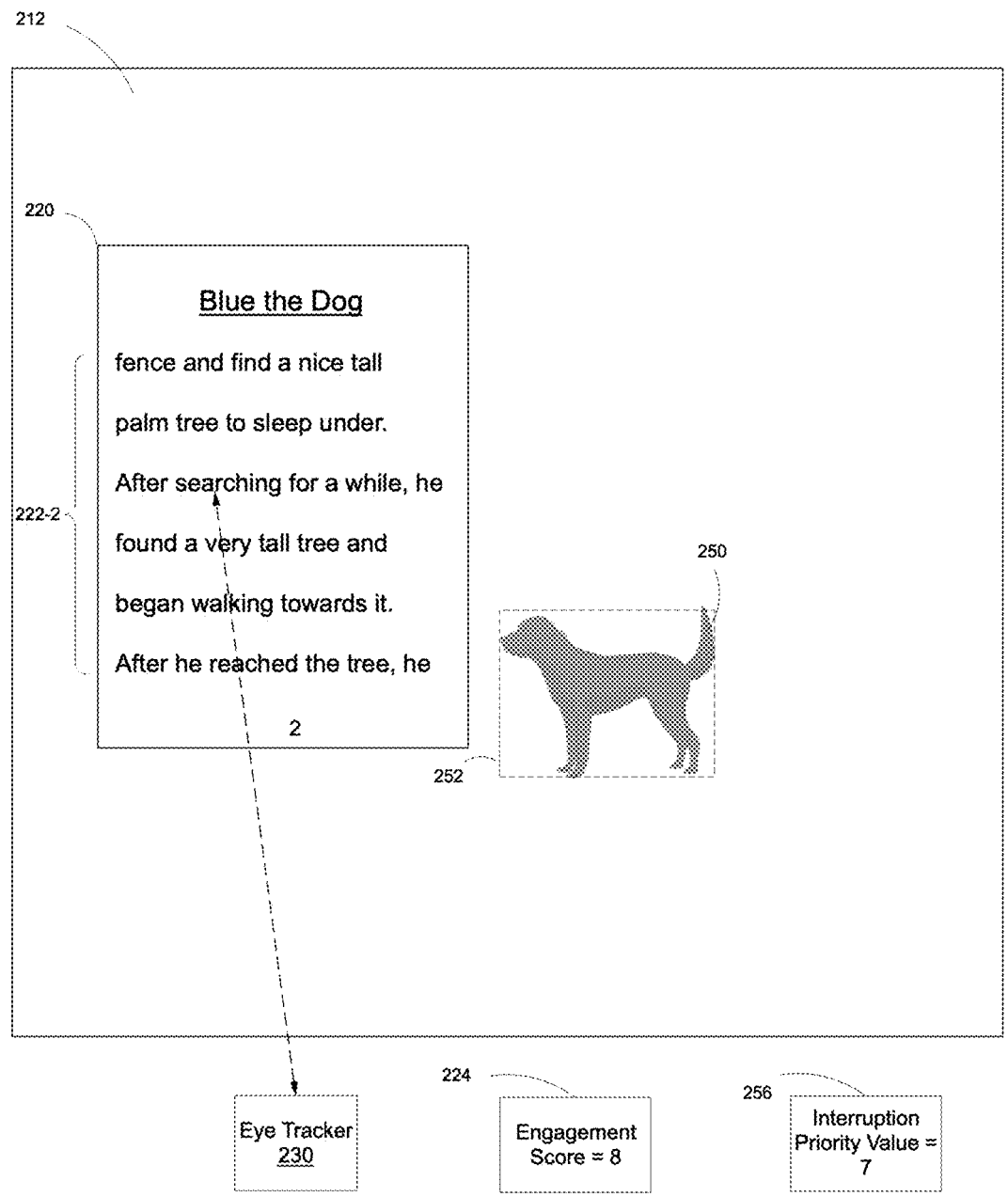
Figure 2M:
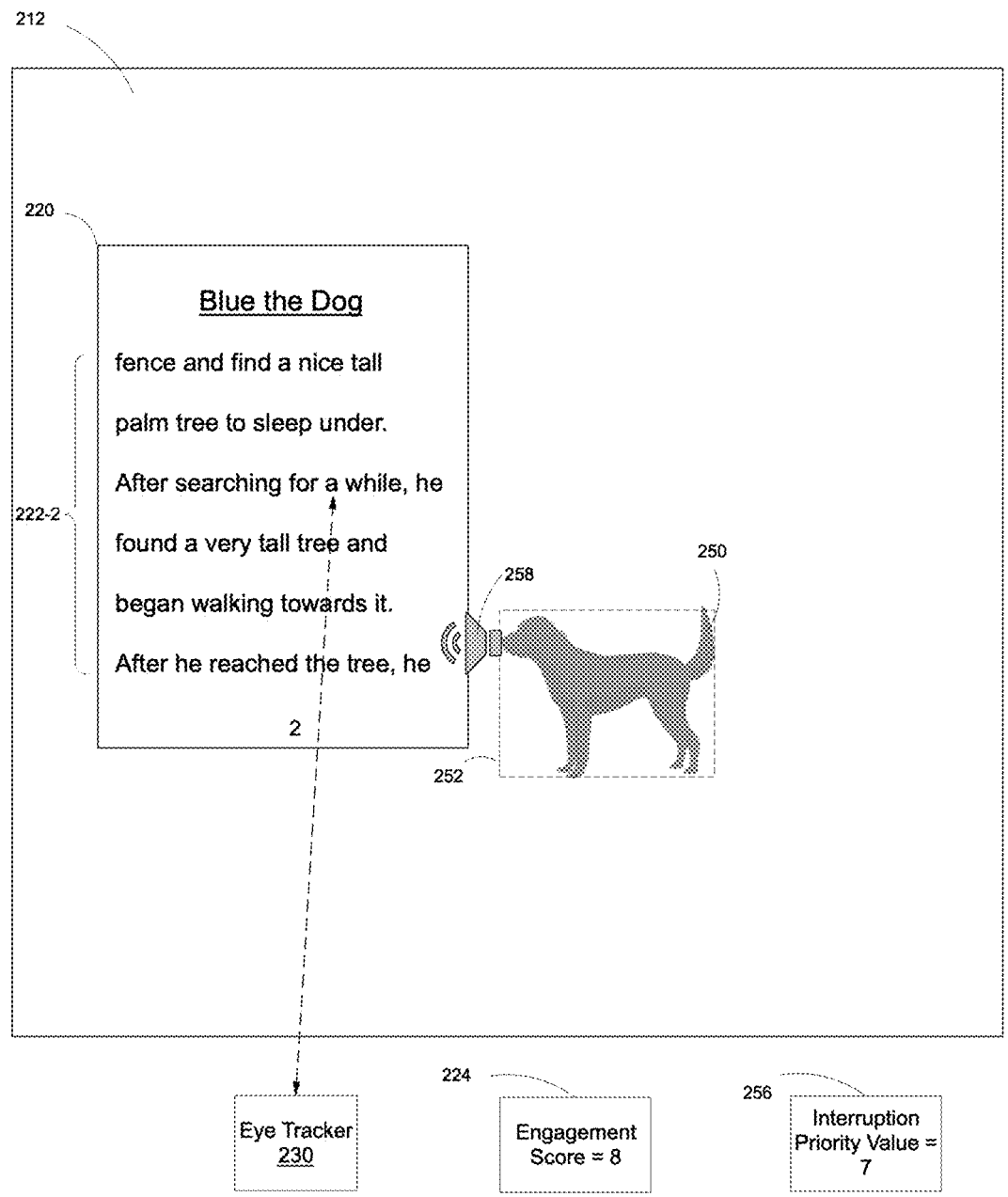
Figure 2N:
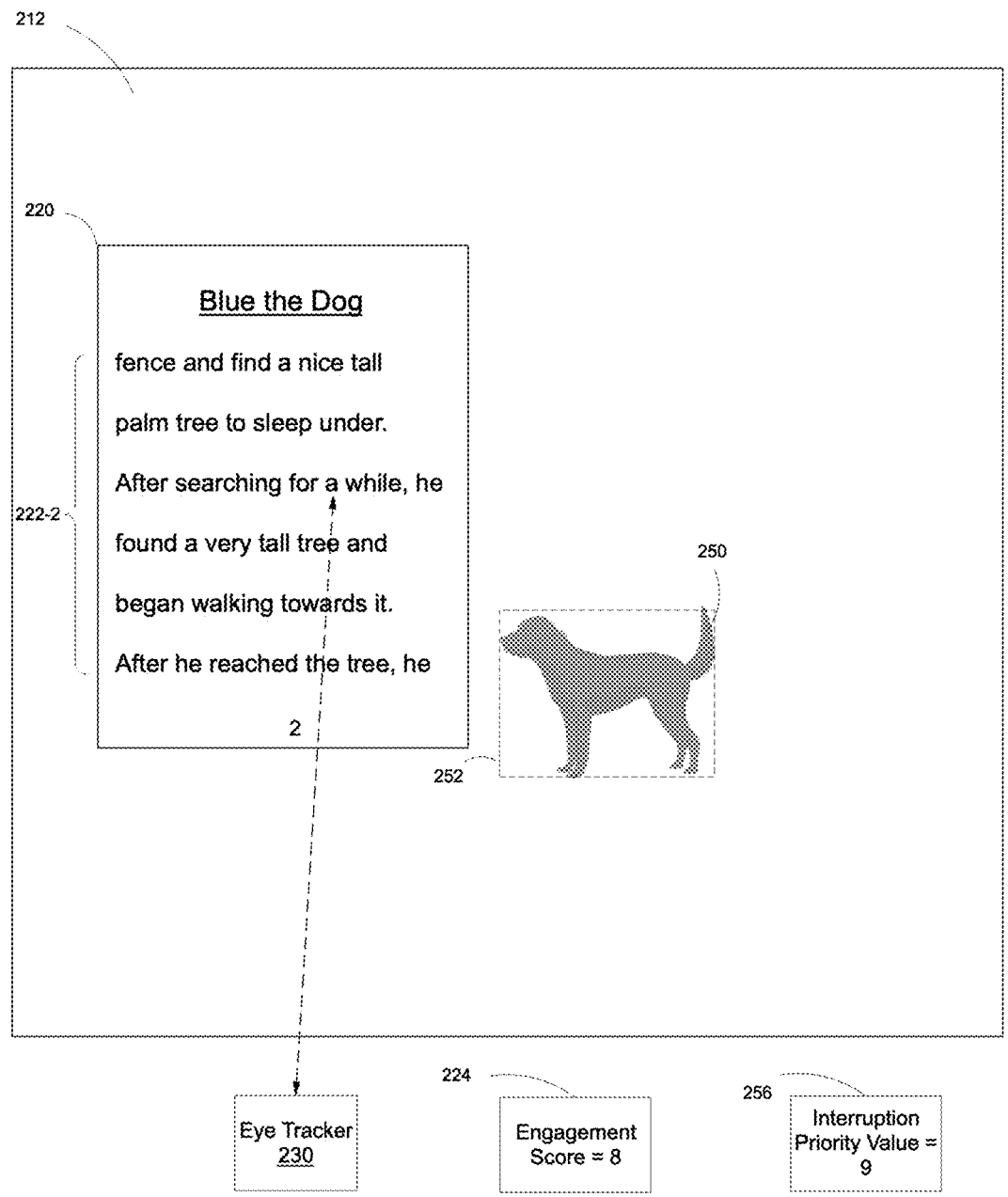
Figure 2O:
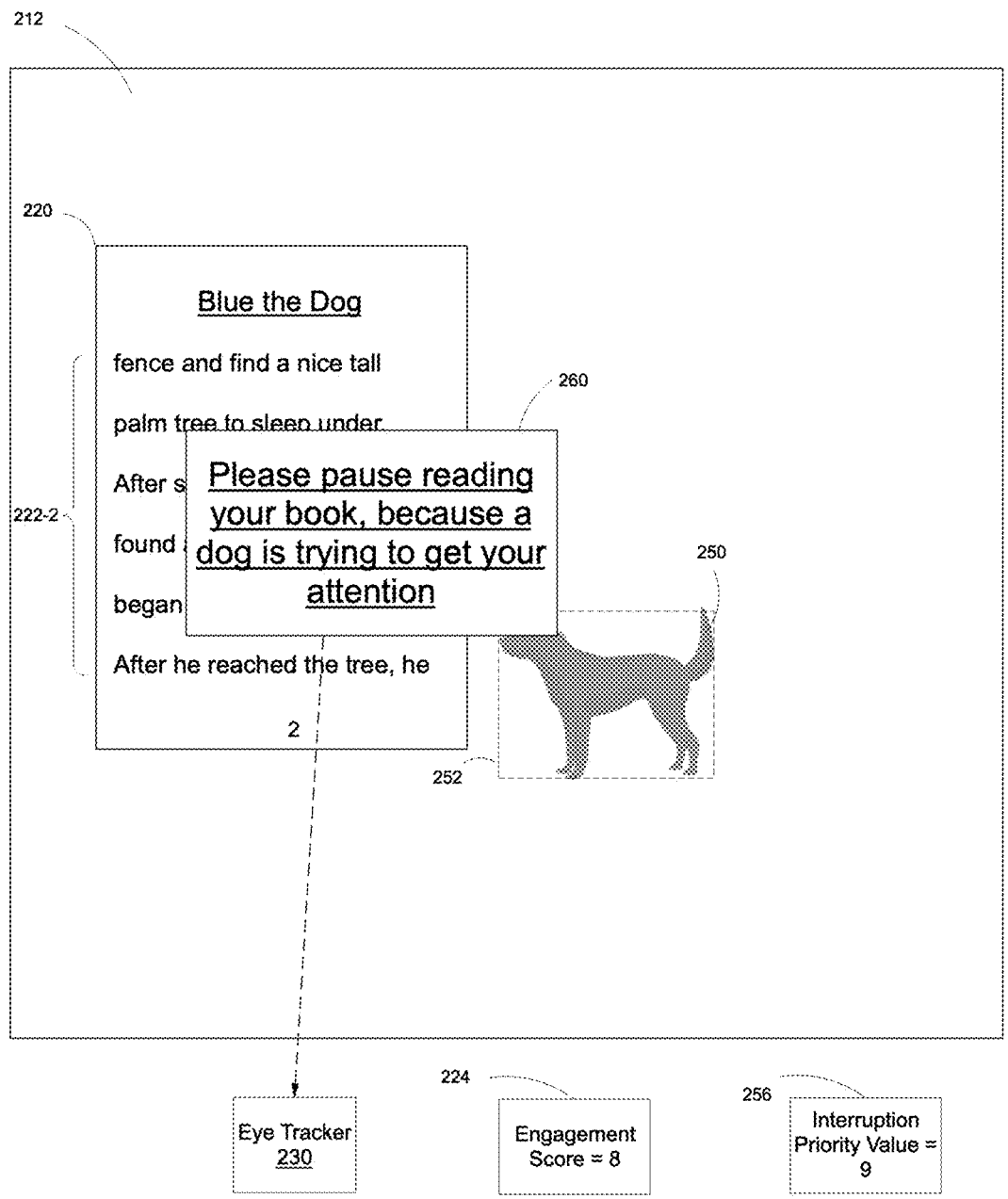
Figure 2P:
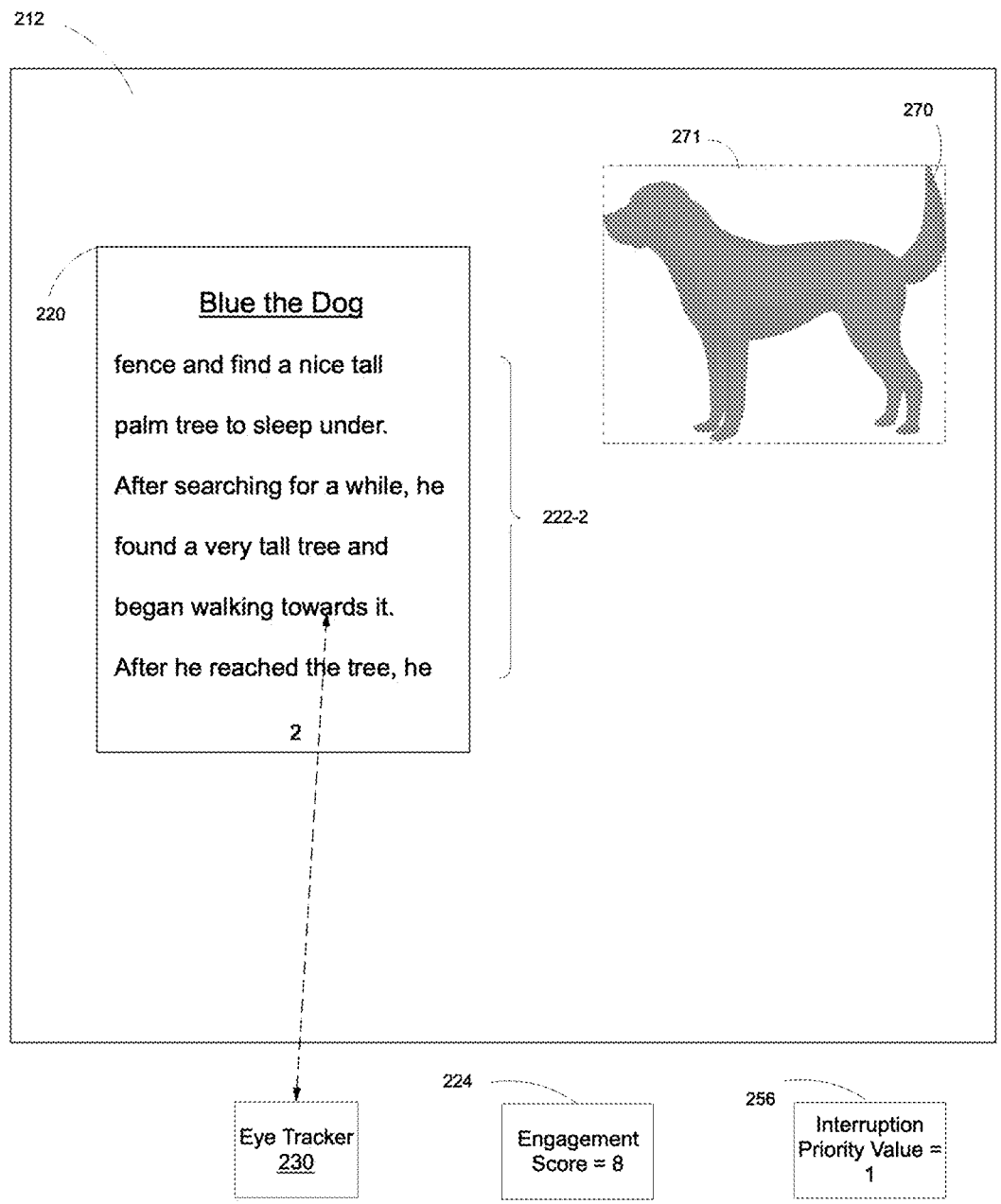
Figure 2Q:
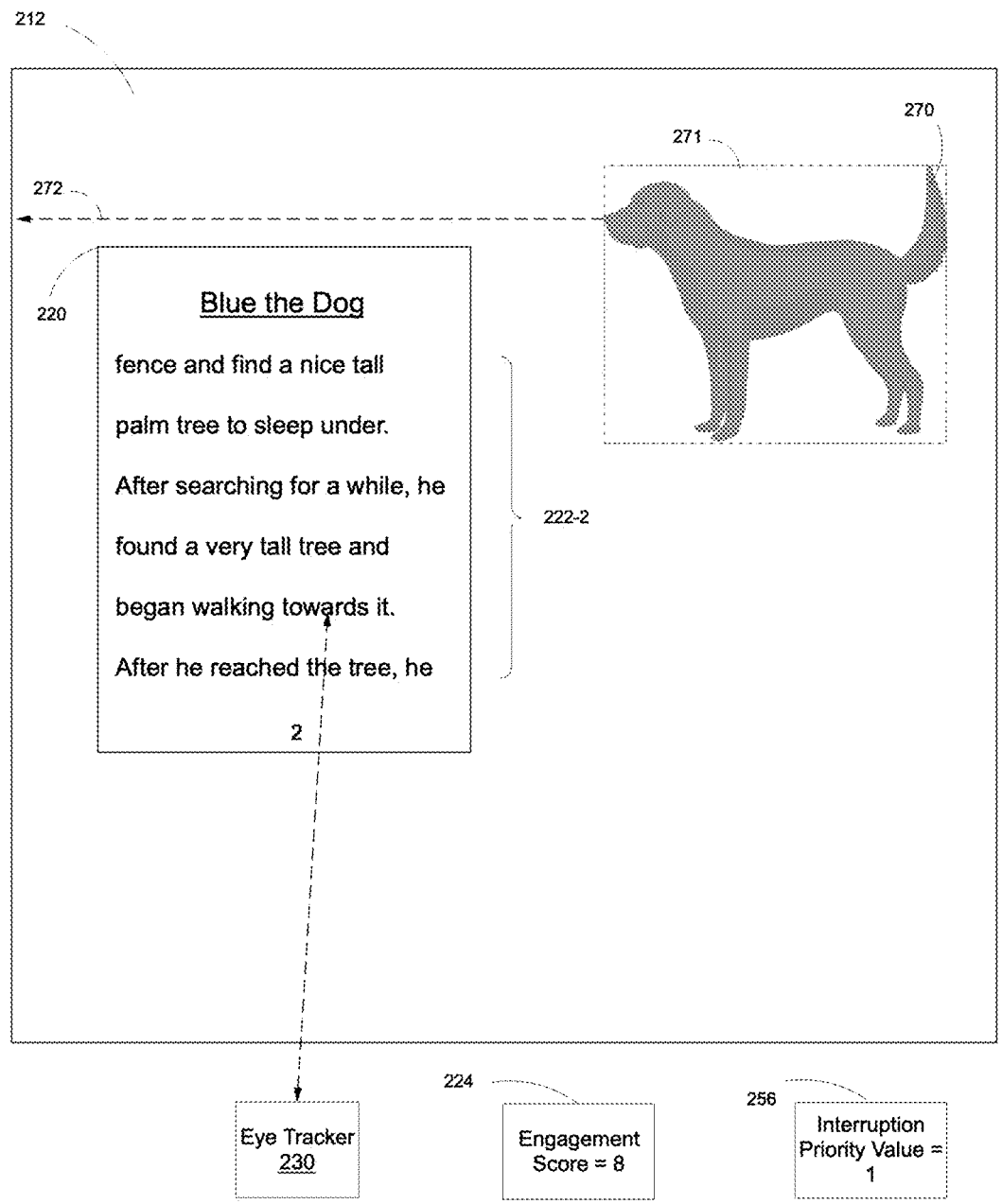
Figure 2R:
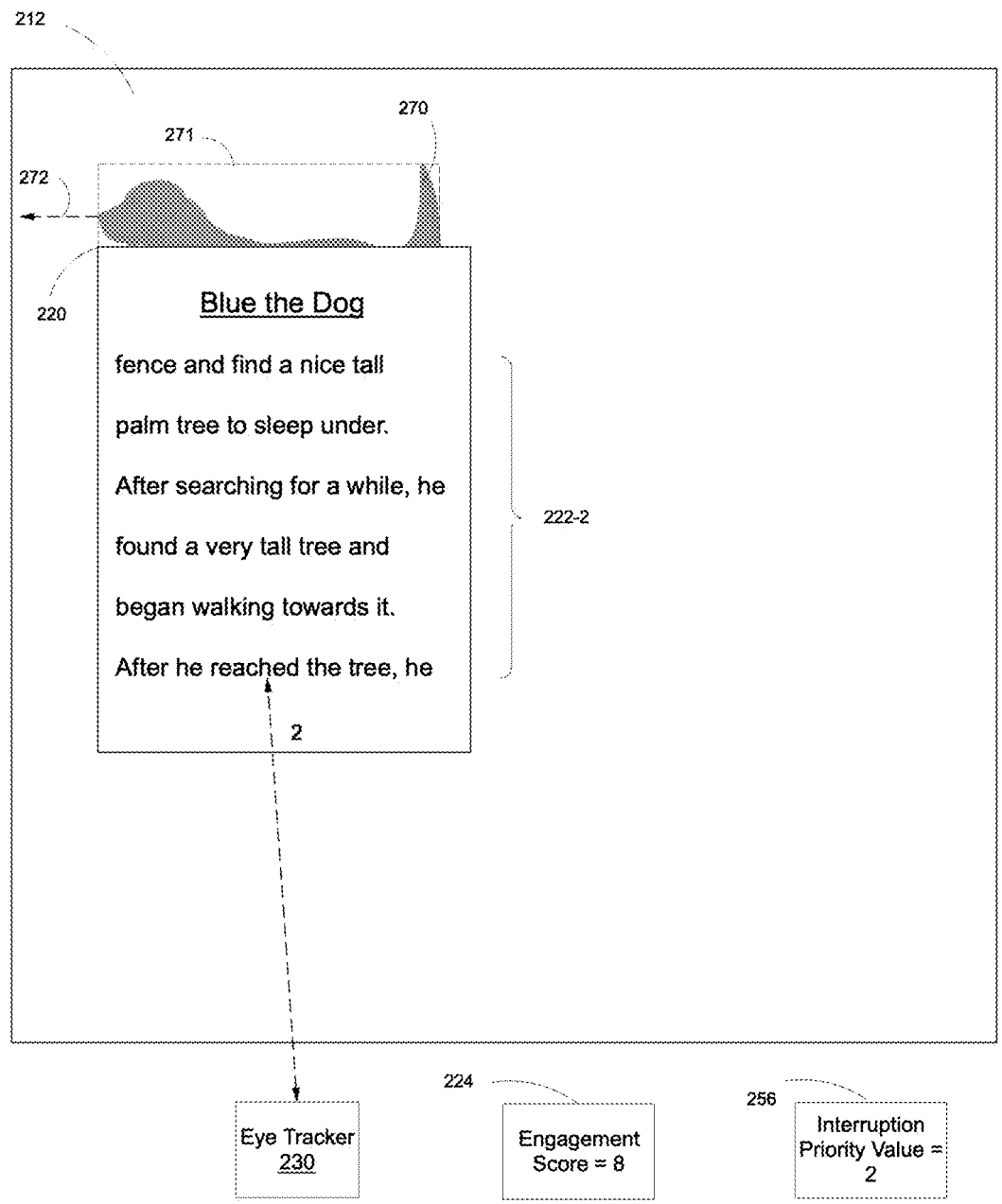
Figure 2S:
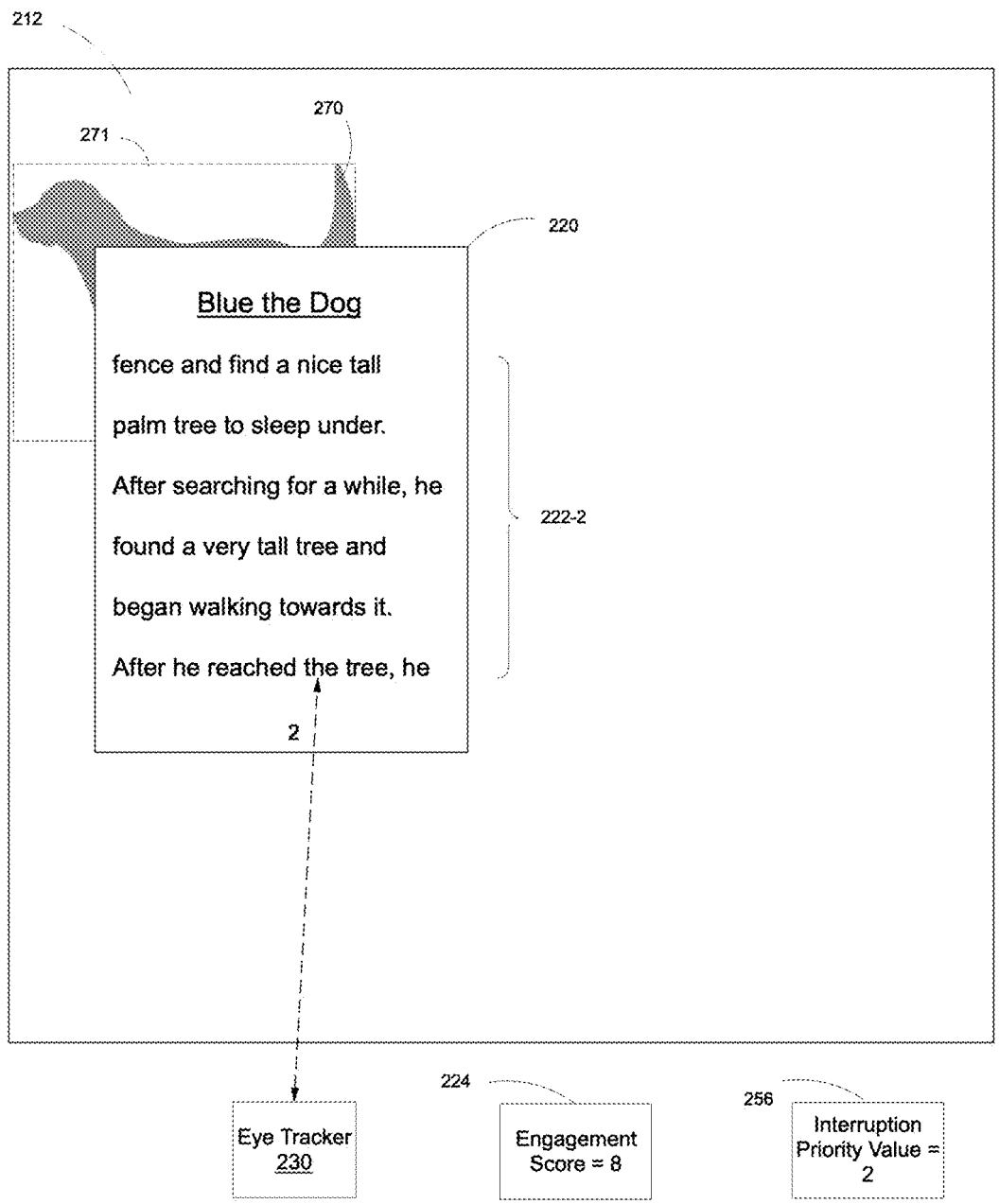

FIGS. 2A-2S are an example of presenting a notification based on an engagement score and an interruption priority value in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As illustrated in FIG. 2A, an electronic device 210 is associated with (e.g., operates according to) an operating environment 200. For example, in some implementations, the electronic device 210 generates one of the XR settings described above. In some implementations, the electronic device 210 corresponds to a mobile device, such as a smartphone, laptop, tablet, etc. In some implementations, the electronic device 210 is similar to and adapted from the electronic device 100 in FIG. 1.

In some implementations, the electronic device 210 corresponds to a head-mountable device (HMD) that includes an integrated display (e.g., a built-in display) that displays a representation of the operating environment 200. In some implementations, the electronic device 210 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 210). For example, in some implementations, the electronic device 210 slides/snaps into or otherwise attaches to the head-mountable enclosure. In some implementations, the display of the device attached to the head-mountable enclosure presents (e.g., displays) the representation of the operating environment 200. For example, in some implementations, the electronic device 210 corresponds to a mobile phone that can be attached to the head-mountable enclosure. In various implementations, examples of the electronic device 210 include smartphones, tablets, media players, laptops, etc.

Referring back to FIG. 2A, the electronic device 210 is being held by a hand of the user 50, with the other hand of the user 50 being a free hand 52. The operating environment 200 includes a first object, corresponding to a book 220 "Blue the Dog." The book 220 is opened to its first page, which includes first text content 222-1.

The electronic device 210 includes a display 212. The display 212 is associated with a field-of-view 214 including the book 220. Accordingly, as illustrated in FIG. 2B, the book 220 is located at a first location on (e.g., towards the left side of) the display 220.

According to various implementations, the electronic device 210 presents the book 220. For example, in some implementations, the book 220 corresponds to a computer-generated (e.g., virtual) object or a pass-through video representation, and the display 212 displays the book 220. As another example, in some implementations, the book 220 corresponds to a physical (e.g., real-world) book that is located within the field-of-view 214, and the user 50 views the physical book through a see-through (e.g., transparent or additive) display 212.

In some implementations, the electronic device 210 includes an eye tracker 230 (e.g., the eye tracking sensor(s) 164) in FIG. 1) that provides eye tracking data associated with the user 50. For example, with reference to FIG. 2B, the eye tracker 230 provides eye tracking data indicating that an eye gaze of the user 50 is directed to the word "Blue" within the first text content 221-1. Accordingly, the electronic device 210 determines that the user 50 is beginning to read the "Blue the Dog" story, and accordingly determines an engagement score 224 of "1." The engagement score characterizes a level of engagement between the user 50 and the book 220. With reference to the example illustrated in FIGS. 2A-2S, the engagement score 224 ranges from "0" (e.g., not engaged at all) to "10" (highest level of engagement). However, one of ordinary skill in the art will appreciate that other implementations include a different range and/or scale for the engagement score 224. Thus, because the user 50 has just begun engaging with the book 220 in FIG. 2B, the engagement score 224 has a relatively low value of "1."

As the user 50 continues reading the first text content 222-1, the eye tracker 230 continues tracking the eye gaze of the user 50 and provides corresponding eye tracking data. Thus, in some implementations, the electronic device 210 increases the engagement score 224 as the user 50 continues to read more of the first text content 222-1, as determined in part from the eye tracking data. For example, as illustrated in FIG. 2C, the eye tracking data indicates that the eye gaze is directed to the last word ("the") of the first text content 222-1. Accordingly, the electronic device 210 increases the engagement score 224 from "1" to "5" because the electronic device 210 determines that the user 50 has read the entirety of the first text content 222-1. In some implementations, the magnitude of the change to the engagement score 224 is a function of a temporal characteristic associated with the eye tracking data. For example, in response to determining that the user 50 spent ten seconds reading the entirety of the first text content 222-1, the electronic device 210 increases the engagement score 224 from "1" to "5." As a counterexample, in response to determining that the user 50 spent 50 seconds reading the entirety of the first text content 222-1, the electronic device 210 increases the engagement score 224 from "1" to "3," because the user 50 may have been distracted with something other than the book 220.

As illustrated in FIG. 2D, in some implementations, the electronic device 210 includes an extremity tracker 240 (e.g., the extremity tracking sensor 150 in FIG. 1) that provides extremity tracking data associated with the user 50. The extremity tracking data indicates a position of a user's extremity (e.g., finger(s), hand, foot). For example, as illustrated in FIG. 2D, based in part on the extremity tracking data, the electronic device 210 determines that the free hand 52 of the user 50 is at a location corresponding to the bottom of the book 220. The free hand 52 is beginning a left swipe gesture in order to request the electronic device 210 to replace the first text content 222-1 with second text content 222-2 (e.g., turn the page to the second page of the book 220). The left swipe gesture is indicated by movement line 242 (illustrated for purely explanatory purposes). As illustrated in FIG. 2E, the free hand 52 is approximately halfway finished with the left swipe gesture, and the free hand 52 completes the left swipe gestures in FIG. 2F. In response to detecting termination of the left swipe gesture, the electronic device 210 replaces the first text content 222-1 with the second text content 222-2, as illustrated in FIG. 2F. The second text content 222-2 corresponds to the second page of the "Blue the Dog" story. Based on the left swipe gesture, the electronic device 210 increases the engagement score 224 from "5" to "7" because the electronic device 210 determines (e.g., infers) that the user 50 intends to continue to read the book 220.

As illustrated in FIGS. 2F and 2G, following the page change, the electronic device 210 determines, based in part on the eye tracking data, that the eye gaze of the user 50 has moved from the bottom of the first text content 222-1 to the top of the second text content 222-2 (the word "fence"). Accordingly, the electronic device 210 increases the engagement score 224 from "7" to "8" because the eye tracking data indicates that the user 50 is continuing to read the newly displayed, second text content 222-2.

As illustrated in FIG. 2H, a second object, corresponding to a dog 250, comes within the field-of-view 214 of the display 212. In some implementations, the first dog 250 corresponds to a physical (e.g., real-world) dog, such as the user's pet dog. For example, the physical dog has recently entered a room in which the user 50 is located and has come within the field-of-view 214 of the display 212. In some implementations, the first dog 250 corresponds to a computer-generated dog that is generated by the electronic device 210.

In some implementations, a second object is detectable by the electronic device 210, but the second object is not within the field-of-view 214 of the display 212. For example, in some implementations, the dog 250 is outside of the field-of-view 214, but an audio sensor (e.g., a microphone) of the electronic device 210 detects a barking sound made by the dog 250.

As illustrated in FIG. 2I, the display 212 continues presenting the book 220 at the first location, and presents the first dog 250 at a second location that is different from the first location. In other words, the electronic device 210 presents the first dog 250 using a display modality of the electronic device 210. Accordingly, while the user 50 is focused on the book 220 and the first dog 250 is within the field-of-view 214 of the display 212, the first dog 250 may be in the peripheral vision of the user 50 or outside of the user's 50 vision completely.

In implementations in which the first dog 250 is a physical dog, the electronic device 210 identifies the first dog 250, as is indicated by bounding box 252 in FIG. 2I (illustrated for purely explanatory purpose). For example, in some implementations, the electronic device 210 performs instance segmentation with respect to the dog 250, identifying the first dog 250 without providing an understanding or meaning with respect to the first dog 250 (e.g., "Object No. 1"). As another example, in some implementations, the electronic device 210 obtains or determines a semantic value for the first dog 250 that indicates an understanding or meaning with respect to the dog 250, such as a semantic value of "Dog."

The electronic device 210 determines an interruption priority value 256 of "1" for the dog 250. The interruption priority value 256 characterizes a relative importance of signaling a presence of the first dog 250 to the user 50. With reference to the example illustrated in FIGS. 2A-2S, the interruption priority value 256 ranges from "0" (e.g., lowest level of interruption) to "10" (highest level of interruption). However, one of ordinary skill in the art will appreciate that other implementations include a different range and/or scale for the interruption priority value 256. Accordingly, because the first dog 250 is initially presented in FIG. 2I, the electronic device 210 increases the interruption priority value 256 from "0" to "1."

As illustrated in FIGS. 2J-2L, the first dog 250 walks towards the book 220, as is indicated by movement line 254 (illustrated for purely explanatory purpose). As the first dog 250 walks towards the book 220, the user 50 continues to read through the second text content 222-2, as the electronic device 210 determines based on the eye tracking data from the eye tracker 230. Accordingly, the electronic device 210 maintains the engagement score 224 at "8."

As illustrated in FIG. 2K, the electronic device 210 determines that the first dog 250 has moved closer to the book 220. Accordingly, the electronic device 210 increases the interruption priority value 256 from "1" to "5" because the location of the first dog 250 moves closer to the book 220, and thus the electronic device 210 determines that the first dog 250 is making a greater attempt to get the attention of the user 50. As illustrated in FIG. 2L, the electronic device 210 determines that the first dog 250 has moved even closer to the book 220. Accordingly, electronic device 210 further increases the interruption priority value 256 from "5" to "7" because the position of the first dog 250 is even closer to the user's focus on the book 220.

As illustrated in FIG. 2M, the first dog 250 produces a sound 258, such as a barking noise. Accordingly, in implementations in which the first dog 250 is a computer-generated dog, the electronic device 210 plays the sound 258 via an integrated speaker. In other words, the electronic device 210 presents the first dog 250 using a sound modality of the electronic device 210. Accordingly, as illustrated in FIG. 2N, the electronic device 210 further increases the interruption priority value 256 from "8" to "9" because the electronic device 210 determines that the sound 258 is another attempt by the first dog 250 to get the attention of the user 50.

In response to determining that the engagement score 224 and the interruption priority value 256 together satisfy an interruption condition, the electronic device 210 presents a notification. For example, as illustrated in FIG. 2O, in response to determining that the interruption priority value 256 exceeds the engagement score 230, the electronic device 210 presents a notification 260 notifying the user 50 to "Please pause reading your book, because a dog is trying to get your attention." As another example, in some implementations, the interruption condition is satisfied when the engagement score 224 does not exceed an engagement threshold and the interruption priority value 256 exceeds an interruption priority threshold.

FIGS. 2P-2S illustrate a counterexample in which the engagement score 224 and the interruption priority value 256 do not together satisfy the interruption condition. As illustrated in FIG. 2P, a second dog 270 is presented at a third location that is different from the first location corresponding to the book 220. Because the second dog 270 is initially presented in FIG. 2P, the electronic device 210 increases an interruption priority value 256 associated with the second dog 270 from "0" to "1." In implementations in which the second dog 270 is a physical dog, the electronic device 210 identifies the second dog 270, as is indicated by bounding box 271 in FIG. 2P (illustrated for purely explanatory purpose).

As illustrated in FIG. 2Q, the second dog 270 begins to walk towards the left edge of the display 212. The movement of the second dog 270 is indicated by movement line 272 (illustrated for purely explanatory purposes). As illustrated in FIG. 2R, the second dog 270 has moved nearer to the left edge of the display 212. Notably, the second dog 270 moves behind the book 220, and thus the book 220 partially obscures the second dog 270. Because the second dog 270 is partially obscured by the book 220, the electronic device 210 determines that the second dog 270 is making a relatively small attempt to get the attention of the user 50. Thus, the electronic device 210 nominally increases the interruption priority value 256 from "1" to "2."

As illustrated in FIG. 2S, the second dog 270 has completed the movement. Because the second dog 270 is still partially obscured by the book 220, the electronic device 210 maintains the interruption priority value 256 at "2." Thus, in contrast the previous example provided with reference to FIGS. 2A-2O, the electronic device 210 foregoes presenting a notification to the user 50 because the engagement score 224 and the interruption priority value 256 do not together satisfy the interruption condition. By foregoing presenting a notification in certain circumstances, the electronic device 210 avoids disrupting user engagement in an undesirable manner. Moreover, foregoing presenting a notification reduces resource utilization by the electronic device 210.

Figure 3:
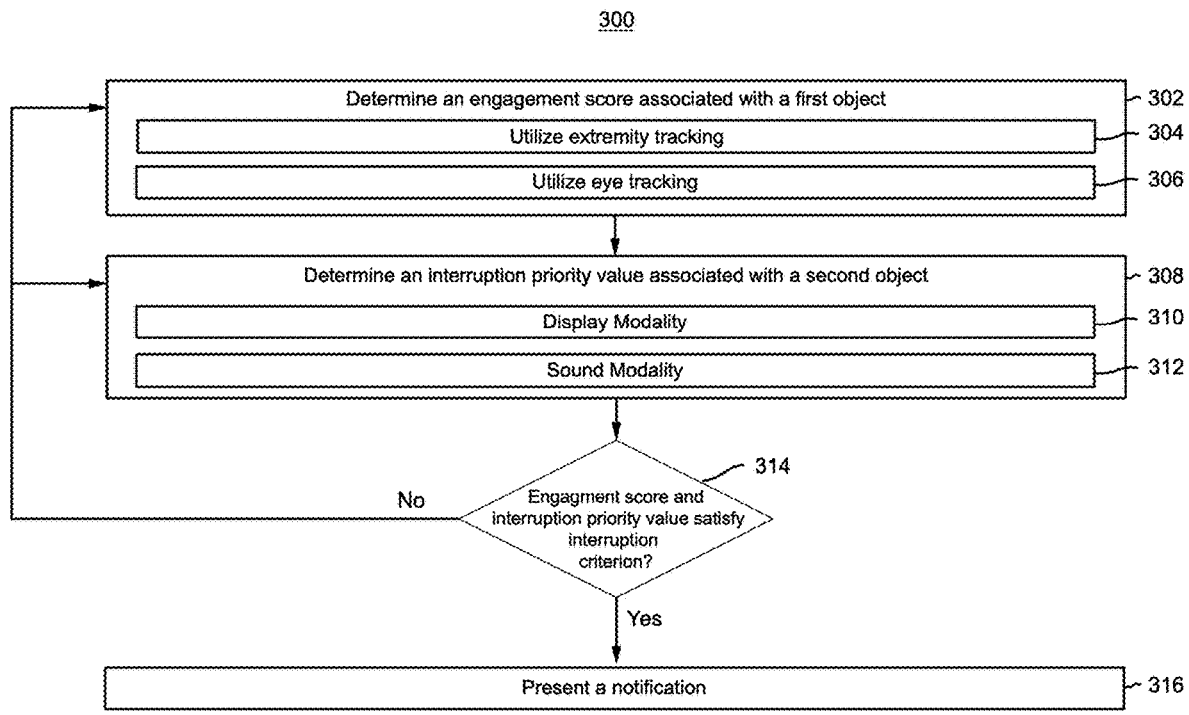
FIG. 3 is an example of a flow diagram of a method of presenting a notification based on an engagement score and an interruption priority value in accordance with some implementations.

FIG. 3 is an example of a flow diagram of a method 300 of presenting a notification based on an engagement score and an interruption priority value in accordance with some implementations. In various implementations, the method 300 or portions thereof are performed by an electronic device (e.g., the electronic device 100 in FIG. 1 or the electronic device 210 in FIGS. 2A-2S). In various implementations, the method 300 or portions thereof are performed by a head-mountable device (HMD). In some implementations, the method 300 is performed by processing logic, including hardware, firmware, software, or a combination thereof. In some implementations, the method 300 is performed by a processor executing code stored in a non-transitory computer-readable medium (e.g., a memory). In various implementations, some operations in method 300 are, optionally, combined and/or the order of some operations is, optionally, changed.

In some implementations, the method 300 is performed by an HMD that includes a see-through display. The see-through display permits ambient light from the physical environment through the see-through display, and the representation of the physical environment is a function of the ambient light. For example, the see-through display is a translucent display, such as glasses with optical see-through. In some implementations, the see-through display is an additive display that enables optical see-through of the physical surface, such as an optical HMD (OHMD). For example, unlike purely compositing using a video stream, the additive display is capable of reflecting projected images off of the display while enabling the user to see through the display. In some implementations, the see-through display includes a photochromic lens. The HMD composites computer-generated objects with the ambient light entering the see-through display in order to generate the operating environment 200 in FIGS. 2A-2S.

In some implementations, the method 300 is performed by an electronic device that includes an image sensor. For example, the image sensor obtains image data characterizing a representation of a physical environment, and composites computer-generated object with the representation of the physical environment in order to the operating environment 200 in FIGS. 2A-2S.

As represented by block 302, the method 300 includes determining an engagement score that characterizes a level of engagement between a user and a first object. The first object is located at a first location on the display. As one example, the engagement score characterizes the user watching television, sleeping, playing a video game, reading, etc. In some implementations, the engagement score characterizes what the user is focused on. The object may correspond to a computer-generated object or a physical object.

As represented by block 304, in some implementations, the electronic device includes an extremity tracker that outputs extremity tracking data associated with the user, and the method 300 includes determining the engagement score based on a function of the extremity tracking data. For example, with reference to FIGS. 2D-2F, in response to detecting a swipe left gesture based on extremity tracking data from the extremity tracker 240, the electronic device 210 increases the engagement score 224 from "5" to "7."

As represented by block 306, in some implementations, the electronic device includes an eye tracker that outputs eye tracking data associated with the user, and the method 300 includes determining the engagement score based on a function of the eye tracking data. For example, with reference to FIG. 2B, the electronic device 210 determines the engagement score 224 of "1" in response to determining that the user 50 begins viewing the first text content 222-1 based on a function of eye tracking data from the eye tracker 230. As another example, when the eye tracking data indicates that the user 50 likely has closed eyes, the electronic device determines a nominal engagement score. As a counterexample, when the eye tracking data indicates user is not blinking very often and/or not moving eyes very often, the electronic device determines a relatively high engagement score.

As represented by block 308, the method 300 includes determining an interruption priority value that characterizes a relative importance of signaling a presence of a second object to the user. The second object is detectable by the electronic device. In some implementations, the interruption priority value is a function of movement of the second object from a second location on the display to a third location of the display. For example, with reference to FIGS. 2J-2L, the first dog 250 moves from the initial location of the display 212 to a destination location on the display 212 that is closer to the book 220. As another example, the movement corresponds to extremity movement of the second object, such as an individual waving hands in order to get the attention of the user of the electronic device.

In some implementations, the method 300 includes presenting the second object according to one or more output modalities of the electronic device. As represented by block 310, in some implementations, the one or more output modalities include a display modality. For example, in some implementations, the second object is within a field-of-view of the display, such as light, reflected off of a physical object, that enters a see-through display of the electronic device. As another example, the electronic device includes an image sensor (e.g., forward-facing camera) that obtains image data representing a physical, second object, and the display displays the image data. As yet another example, the second object corresponds to a computer-generated object that is composited with pass-through image data or added to light entering a see-through display.

In some implementations, an electronic device presents the second object at a second location on the display that is different from the first location associated with the first object. As one example, with reference to FIG. 2H, the second object (e.g., the first dog 250) is initially presented near the right edge of the display 212, whereas the first object (e.g., the book 220) is presented near the left edge of the display 212. In some implementations, the first location exceeds a distance threshold with respect to the second location.

In some implementations, the object corresponds to an entity, such as a real person or a computer-generated entity walking across the scene. For example, the computer-generated entity is a virtual agent that is controlled by the electronic device, such as an avatar that represents a corresponding physical entity. In some implementations, the entity corresponds to a living object (real or computer-generated), such as a person, animal, plant, etc. In such implementations, the method 300 includes semantically identifying a physical (e.g., real-world) object, such as via semantic segmentation and/or with the aid of a neural network.

As represented by block 312, in some implementations, the one or more output modalities include a sound modality. For example, with reference to FIG. 2M, the electronic device 210 plays (e.g., via the speaker 111) the bark of the first dog 250. As another example, an electronic device plays a sound (e.g., "Hey, Bill!") uttered by an individual within an operating environment. In some implementations, the second object produces a sound that is detectable by an audio sensor of the electronic device, but the second object is outside of the field-of-view of the display. For example, the second object is a beep made by a car moving towards, but out of view of, the display.

As represented by block 314, in some implementations, the method 300 includes determining whether or not the engagement score and the interruption priority value together satisfy an interruption condition. For example, in some implementations, the method 300 includes determining whether or not the engagement score exceeds an engagement threshold, and determining whether or not the interruption priority value exceeds an interruption priority threshold. Continuing with this example, the method 300 includes determining that the engagement score and the interruption priority value together satisfy the interruption condition based on the engagement score not exceeding the engagement threshold and the interruption priority value exceeding the interruption priority threshold.

In some implementations, the interruption condition is satisfied when the interruption priority value exceeds the engagement value, such as described with reference to FIG. 2N.

In some implementations, the method 300 includes determining that the engagement score and the interruption priority value together satisfy the interruption condition in accordance with a determination that movement of the second object from the second location to the third location is within a threshold distance from the first location associated with the first object. For example, in response to determining that the second object moves to within one foot of the first object, the electronic device determines that the interruption condition is satisfied, independent of the value of the engagement score.

In some implementations, the method 300 includes determining that the engagement score and the interruption priority value together satisfy the interruption condition in accordance with a determination that sound produced by the second object (described with reference to block 312) exceeds a threshold volume level.

As represented by block 316, in response to determining that the engagement score and the interruption priority value together satisfy the interruption condition ("Yes" branch), the method 300 includes presenting a notification. In some implementations, the method 300 includes determining the notification based on a combination of the first object and the second object. For example, with reference to FIG. 2O, the notification 260 ("Please pause reading your book, because a dog is trying to get your attention") includes a reference to the first object 220 ("book") and the second object 250 ("dog"). As another example, in some implementations, the notification is a function of a position of the first object relative to a position of the second object. For example, with reference to FIG. 2O, in some implementations, the notification 260 includes a suggestion to "look to the right to see the dog."

In some implementations, the notification corresponds to displayable content, such as a computer-generated object or a computer-generated affordance. For example, as illustrated in FIG. 2O, the display 212 displays the notification 260. Thus, in some implementations, presenting the notification includes displaying, on the display, the displayable content.

In some implementations, the notification corresponds to audio content, such as an utterance, recorded audio clip, etc., that is detected via an audio sensor integrated in the electronic device. In some implementations, presenting the notification includes playing, via a speaker integrated in the electronic device, the audio content.

In some implementations, presenting the notification includes reducing the perceptibility (by the user) of currently presented content. For example, in some implementations, presenting the notification includes pausing playback of media content currently playing (e.g., a movie that is playing). As another example, in some implementations, presenting the notification includes ceasing to display or obscuring content on the display, such as displaying a computer-generated wall between the user and a television on which the user was focused.

On the other hand, in response to determining that the engagement score and the interruption priority value do not together satisfy the interruption condition ("No" branch), the method 300 foregoes presenting a notification and reverts back to a portion of the method 300 represented by blocks 302 and/or 308. For example, with reference to FIGS. 2P-2S, the second dog 270 stays sufficiently outside of the focus of the user 50, and thus the corresponding interruption priority value 256 does not exceed the engagement score 224. Accordingly, as illustrated in FIG. 2S, the electronic device 210 foregoes presenting a notification, but continues determining the engagement score 224 and the interruption priority value 256.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:
1. A method comprising:
  at an electronic device with one or more processors, a non-transitory memory, and a display:
    determining an engagement score that characterizes a level of engagement between a user and a first object, wherein the first object is located at a first location on the display;

detecting a second object, different from the first object, within a physical environment, wherein the second object corresponds to a physical object within the physical environment;

in response to detecting the second object, determining an interruption priority value associated with the second object that characterizes a relative importance of signaling presence of the second object within the physical environment; and in response to determining that the engagement score and the interruption priority value together satisfy an interruption condition, presenting, via the display, a notification.

2. The method of claim 1, further comprising presenting the second object according to one or more output modalities of the electronic device.

3. The method of claim 2, wherein the one or more output modalities include a display modality.

4. The method of claim 3, wherein the display modality corresponds to displaying the second object at a second location that is different from the first location.

5. The method of claim 4, wherein the first location exceeds a distance threshold with respect to the second location.

6. The method of claim 4, wherein the interruption priority value is a function of movement of the second object from the second location to a third location.

7. The method of claim 6, further comprising determining that the engagement score and the interruption priority value together satisfy the interruption condition in accordance with a determination that the third location is less than a threshold distance from the first location.

8. The method of claim 1, wherein the one or more output modalities include a sound modality.

9. The method of claim 8, further comprising determining that the engagement score and the interruption priority value together satisfy the interruption condition in accordance with a determination that a sound, that is associated with the sound modality, exceeds a threshold volume level.

10. The method of claim 1, wherein the first object corresponds to a physical object.

11. The method of claim 1, wherein the first object corresponds to a computer-generated object.

12. The method of claim 1, wherein the first object corresponds to text content.

13. The method of claim 12, wherein determining the interruption priority value includes semantically identifying the physical object.

14. The method of claim 1, further comprising:
determining whether or not the engagement score exceeds an engagement threshold;
determining whether or not the interruption priority value exceeds an interruption priority threshold; and
determining that the engagement score and the interruption priority value together satisfy the interruption condition based on the engagement score not exceeding the engagement threshold and the interruption priority value exceeding the interruption priority threshold.

15. The method of claim 1, wherein the electronic device includes an extremity tracker that outputs extremity tracking data associated with the user, and wherein determining the engagement score is based on a function of the extremity tracking data.

16. The method of claim 1, wherein the electronic device includes an eye tracker that outputs eye tracking data associated with the user, and wherein determining the engagement score is based on a function of the eye tracking data.

17. The method of claim 1, wherein the electronic device includes a speaker, and further comprising playing audio content via the speaker in association with the notification.

18. The method of claim 1, wherein the engagement score and the interruption priority value together satisfy the interruption condition in accordance with a determination that the interruption priority value exceeds the engagement score.

19. An electronic device comprising:
one or more processors;
a non-transitory memory;
a display; and
one or more programs, wherein the one or more programs are stored in the non-transitory memory and configured to be executed by the one or more processors, the one or more programs including instructions for:
determining an engagement score that characterizes a level of engagement between a user and a first object, wherein the first object is located at a first location on the display;
detecting a second object, different from the first object, within a physical environment, wherein the second object corresponds to a physical object within the physical environment;
in response to detecting the second object, determining an interruption priority value associated with the second object that characterizes a relative importance of signaling presence of the second object within the physical environment; and
in response to determining that the engagement score and the interruption priority value together satisfy an interruption condition, presenting, via the display, a notification.

20. The electronic device of claim 19, wherein the one or more programs further include instructions for:
presenting the second object according to one or more output modalities of the electronic device, wherein the one or more output modalities includes at least one of a display modality and a sound modality, wherein the display modality corresponds to displaying the second object at a second location that is different from the first location that exceeds a distance threshold with respect to the second location.

21. The electronic device of claim 19, wherein the one or more programs further include instructions for:
determining whether or not the engagement score exceeds an engagement threshold;
determining whether or not the interruption priority value exceeds an interruption priority threshold; and
determining that the engagement score and the interruption priority value together satisfy the interruption condition based on the engagement score not exceeding the engagement threshold and the interruption priority value exceeding the interruption priority threshold.

22. The electronic device of claim 19, wherein the engagement score and the interruption priority value together satisfy the interruption condition in accordance with a determination that the interruption priority value exceeds the engagement score.

23. A non-transitory computer readable storage medium storing one or more programs, the one or more programs comprising instructions, which, when executed by an electronic device with one or more processors and a display, cause the electronic device to:

determine an engagement score that characterizes a level of engagement between a user and a first object, wherein the first object is located at a first location on the display;

detect a second object, different from the first object, within a physical environment, wherein the second object corresponds to a physical object within the physical environment;

in response to detecting the second object, determine an interruption priority value associated with the second object that characterizes a relative importance of signaling presence of the second object within the physical environment; and in response to determining that the engagement score and the interruption priority value together satisfy an interruption condition, present, via the display, a notification.

24. The non-transitory computer readable storage medium of claim 23, wherein the one or more programs further comprise instructions, which cause the electronic device to:

present the second object according to one or more output modalities of the electronic device, wherein the one or more output modalities includes at least one of a display modality and a sound modality, wherein the display modality corresponds to displaying the second object at a second location that is different from the first location that exceeds a distance threshold with respect to the second location.

25. The non-transitory computer readable storage medium of claim 23, wherein the one or more programs further comprise instructions, which cause the electronic device to:

determine whether or not the engagement score exceeds an engagement threshold;

determine whether or not the interruption priority value exceeds an interruption priority threshold; and determine that the engagement score and the interruption priority value together satisfy the interruption condition based on the engagement score not exceeding the engagement threshold and the interruption priority value exceeding the interruption priority threshold.

26. The non-transitory computer readable storage medium of claim 23, wherein the engagement score and the interruption priority value together satisfy the interruption condition in accordance with a determination that the interruption priority value exceeds the engagement score.

* * * * *